US011491685B2

(12) United States Patent
Ochi et al.

(10) Patent No.: US 11,491,685 B2
(45) Date of Patent: Nov. 8, 2022

(54) PRODUCTION METHOD FOR PREPREG, PREPREG TAPE, AND FIBER REINFORCED COMPOSITE MATERIAL, AND PREPREG PRODUCTION DEVICE

(71) Applicant: Toray Industries, Inc., Tokyo (JP)

(72) Inventors: Takashi Ochi, Ehime (JP); Yoshikazu Kono, Ehime (JP); So Nishino, Otsu (JP); Junichi Aoki, Ehime (JP); Kiyoshi Minoura, Otsu (JP); Tamotsu Suzuki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/266,413

(22) PCT Filed: Aug. 20, 2019

(86) PCT No.: PCT/JP2019/032496
§ 371 (c)(1),
(2) Date: Feb. 5, 2021

(87) PCT Pub. No.: WO2020/040154
PCT Pub. Date: Feb. 27, 2020

(65) Prior Publication Data
US 2021/0291405 A1 Sep. 23, 2021

(30) Foreign Application Priority Data

Aug. 22, 2018 (JP) .............................. JP2018-155066
Aug. 22, 2018 (JP) .............................. JP2018-155077

(51) Int. Cl.
B29B 11/16 (2006.01)
B29K 63/00 (2006.01)
B29K 307/04 (2006.01)

(52) U.S. Cl.
CPC .......... B29B 11/16 (2013.01); B29K 2063/00 (2013.01); B29K 2307/04 (2013.01)

(58) Field of Classification Search
None
See application file for complete search history.

(56) References Cited

U.S. PATENT DOCUMENTS 3,378,884 A * 4/1968 Meteer .................. B29C 70/521
156/551
5,529,652 A * 6/1996 Asai ........................ B29C 48/34
156/180

(Continued)

FOREIGN PATENT DOCUMENTS

CN 201745120 U * 2/2011
JP 4930453 A 3/1974

(Continued)

OTHER PUBLICATIONS

Machine Translation of Japanese Patent 64-56741, Date Unknown.*

(Continued)

Primary Examiner — Jeffry H Aftergut
(74) Attorney, Agent, or Firm — RatnerPrestia

(57) ABSTRACT

A method is described for producing a prepreg formed by applying a matrix resin to a reinforcing fiber sheet, wherein the method can effect continuous running without clogging due to generated fuzz even at a high running speed and effect efficient impregnation of the reinforcing fiber sheet with a matrix resin. A method of producing a prepreg includes allowing a reinforcing fiber sheet to pass substantially vertically downward through the inside of a coating section storing a matrix resin to obtain a matrix resin-impregnated reinforcing fiber sheet in which the matrix resin is applied to the reinforcing fiber sheet and at least heating the matrix resin-impregnated reinforcing fiber sheet, wherein the coating section includes a liquid pool and a narrowed section (Continued)

which are in communication with each other, wherein the liquid pool has a portion whose cross-sectional area decreases continuously along a running direction of the reinforcing fiber sheet.

10 Claims, 22 Drawing Sheets

(56) References Cited

U.S. PATENT DOCUMENTS

| | | | | |
|---|---|---|---|---|
| 5,911,932 | A | * | 6/1999 | Dyksterhouse ....... B29B 15/122 264/136 |
| 9,233,336 | B2 | | 1/2016 | Ishibashi et al. |
| 9,410,004 | B2 | | 8/2016 | Asano et al. |
| 11,192,280 | B2 | * | 12/2021 | Ochi ..................... B29B 15/125 |
| 11,224,993 | B2 | * | 1/2022 | Ochi ..................... B29B 11/16 |
| 2014/0175694 | A1 | | 6/2014 | Mizuta et al. |
| 2016/0303777 | A1 | | 10/2016 | Miyauchi et al. |
| 2020/0131325 | A1 | | 4/2020 | Yamada et al. |

FOREIGN PATENT DOCUMENTS

| | | | | |
|---|---|---|---|---|
| JP | 01016612 | A | | 1/1989 |
| JP | 64-56741 | A | * | 3/1989 |
| JP | 01104624 | A | | 4/1989 |
| JP | 1-178412 | A | * | 7/1989 |
| JP | 0631821 | A | | 2/1994 |
| JP | 07252372 | A | | 10/1995 |
| JP | 3252278 | B2 | | 2/2002 |
| JP | 2011132389 | A | | 7/2011 |
| JP | 2012018657 | A | | 1/2012 |
| JP | 2013022868 | A | | 2/2013 |
| JP | 2015022799 | A | | 2/2015 |
| JP | 2016203397 | A | | 12/2016 |
| JP | 2017154330 | A | | 9/2017 |
| WO | 0128951 | A2 | | 4/2001 |
| WO | WO-01/28951 | A2 | * | 4/2001 |
| WO | 2005002819 | A2 | | 1/2005 |
| WO | 2009142231 | A1 | | 11/2009 |
| WO | 2010150022 | A1 | | 12/2010 |
| WO | 2012002417 | A1 | | 1/2012 |
| WO | 2013038521 | A1 | | 3/2013 |
| WO | 2015060299 | A1 | | 4/2015 |
| WO | 2015076981 | A1 | | 5/2015 |
| WO | 2017068159 | A1 | | 4/2017 |
| WO | 2019017057 | A1 | | 1/2019 |

OTHER PUBLICATIONS

Machine Translation of Chinese Patent 201745120, Date Unknown.*
Machine Translation of Japanese Patent 1-178412, Date Unknown.*
Kawabe, K., "New Spreading Technology for Carbon Fiber Tow and Its Application to Composite Materials", Sen'i Gakkaishi, vol. 64, No. 8, 2008, pp. 262-267.
International Search Report and Written Opinion for International Application No. PCT/JP2019/032496, dated Nov. 12, 2019, 7 pages.

* cited by examiner

PRODUCTION METHOD FOR PREPREG, PREPREG TAPE, AND FIBER REINFORCED COMPOSITE MATERIAL, AND PREPREG PRODUCTION DEVICE

CROSS REFERENCE TO RELATED APPLICATIONS

This is the U.S. National Phase application of PCT/JP2019/032496, filed Aug. 20, 2019, which claims priority to Japanese Patent Application No. 2018-155066, filed Aug. 22, 2018, and Japanese Patent Application No. 2018-155077, filed Aug. 22, 2018, the disclosures of each of these applications being incorporated herein by reference in their entireties for all purposes.

FIELD OF THE INVENTION

The present invention relates to: methods of producing a prepreg, a prepreg tape, and a fiber reinforced composite material, and to a prepreg production apparatus; and particularly relates to a method and apparatus for impregnating a reinforcing fiber sheet with a matrix resin uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where high mechanical property and lightness are required. On the other hand, in cases where cost has priority over a mechanical property and lightness, glass fiber reinforced composite materials (GFRP) are used. FRP is obtained by impregnating a reinforcing fiber bundle with a matrix resin to obtain an intermediate base material, which is laminated and formed, and further thermally cured if a thermosetting resin is used, members composed of FRP are then produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slitting broad sheet-like intermediate base materials into tapes having a desired width or impregnating a narrow reinforcing fiber sheet directly with matrix resins.

As two-dimensional sheet-like intermediate base materials, prepregs obtained by impregnating reinforcing fiber sheets with matrix resins are widely used. Examples of reinforcing fiber sheets used for prepregs include UD base materials obtained in sheet-like form by arranging reinforcing fibers unidirectionally and reinforcing fiber fabrics that are woven fabrics obtained by arranging reinforcing fibers multidirectionally. UD base materials are often used particularly in cases where the mechanical property has priority.

A hot-melt process that is one of the methods of producing prepregs is a method in which a matrix resin is melted and then applied onto release sheets, a laminated structure is produced in which a reinforcing fiber sheet is sandwiched between the matrix resin sheets at the upper side and lower side of the reinforcing fiber sheet, and then, the inside of the reinforcing fiber sheet is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As another example, Patent Literature 2 describes a method in which a coating film is formed on both faces of a sheet-like object simultaneously, but this is a method in which a sheet-like object is allowed to pass through a web-guide and coated using a pipe type doctor blade in order to prevent fluctuation of the sheet-like object in the formation of the coating film.

As a method of producing strip-like prepreg using a thermoplastic resin, a horizontal type pultrusion method is known in which a strip-like reinforcing fiber bundle is conveyed in the horizontal direction (longitudinal direction) and is allowed to pass through a die, where the strip-like reinforcing fiber bundle is provided and impregnated with a thermoplastic resin (Patent Literature 3 and Patent Literature 4). According to Patent Literature 3, a tape-like reinforcing fiber is allowed to pass through a crosshead (in FIG. 2 in Patent Literature 3), and the tape-like reinforcing fiber bundle is provided with a resin immediately before a linear die in the crosshead. Patent Literature 4 explains that a plurality of strip-like reinforcing fiber bundles are separately introduced into a die filled with molten thermoplastic resin, opened, impregnated, and laminated using a fixed guide (for example, a squeeze bar), and finally withdrawn from the die as one sheet of prepreg.

PATENT LITERATURE

Patent Literature 1: WO2001/028951A1
Patent Literature 2: JP3252278B2
Patent Literature 3: JP H06-031821A
Patent Literature 4: WO2012/002417A1

SUMMARY OF THE INVENTION

However, the method in Patent Literature 1 enables only a strand-like or roving-like object to be produced, and is not applicable to producing a sheet-like prepreg at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a reinforcing fiber sheet conceivably causes the arrangement of the reinforcing fibers to be disturbed, resulting in not only degrading the grade of the prepreg but also decreasing the mechanical property of FRP.

In addition, the sheet-like object in Patent Literature 2 is a film, cloth, paper, foil, punching plate, network-like sheet material, or the like, and is not intended for a reinforcing fiber sheet at which the present invention is directed. If the technology of Patent Literature 2 is applied to a reinforcing fiber sheet composed of carbon fiber, abrasion at the web-guide generates fuzz, conceivably making it difficult for the reinforcing fiber sheet to run. In addition, the technology of Patent Literature 2 is intended for coating with resin, not for impregnation.

According to the technology of Patent Literature 3, a tape-like reinforcing fiber passes through a slit-like guider chip with no resin in the fore portion of a die in a crosshead, and accordingly, the fore portion is more likely to be clogged with fuzz and also has no function for removing the fuzz, conceivably making it difficult to run the tape-like reinforcing fiber continuously for a long time. This tendency is considered to be remarkable particularly with carbon fiber, which is more likely to generate fuzz.

In addition, the method of Patent Literature 4 makes it more likely that fuzz is retained in a liquid pool during continuous production and that the fuzz clogs a pultrusion portion. There is a problem in that, in particular, running a strip-like reinforcing fiber bundle continuously at a high speed causes the frequency of clogging with fuzz to be very high, and accordingly, enables production to be carried out only at a very low speed and fails to increase productivity. In addition, a horizontal type pultrusion method makes it necessary to seal the die hermetically to prevent liquid leakage and makes it insufficient to collect fuzz during continuous production. Furthermore in the horizontal type pultrusion method, impregnating the inside of a reinforcing fiber sheet with a matrix resin causes bubbles remaining in the reinforcing fiber sheet to be discharged, by ascending force, in a direction perpendicular to the running direction of the reinforcing fiber sheet, and accordingly, the discharge of the bubbles progresses in such a manner that the bubbles push away the matrix resin in-coming for impregnation. Because of this, there is a problem in that not only the movement of the bubbles is inhibited by the liquid, but also the impregnation with the matrix resin is inhibited by the bubbles, resulting in low impregnation efficiency. In this regard, Patent Literature 4 also proposes exhausting bubbles through a vent, but the exhaustion takes place only near the outlet of a die, and the effect of the exhaustion is considered to be limitative.

Thus, an efficient method of applying a matrix resin to a reinforcing fiber sheet such as a UD base material or a reinforcing fiber fabric, particularly an efficient method of producing a sheet-like prepreg using a UD base material has not been established yet.

An object of the present invention relates to a method of producing a prepreg, and is to provide a production method and an apparatus for producing a prepreg, wherein generation of fuzz is suppressed, continuous production is possible without clogging with fuzz, a reinforcing fiber sheet is efficiently impregnated with a matrix resin, the production speed can be made higher, and furthermore, the resulting reinforcing fiber sheet is inhibited from, for example, being folded and has an areal weight uniformly.

The above-mentioned problem is solved by a method of producing a prepreg according to the present invention, including the steps of:
allowing a reinforcing fiber sheet to pass substantially vertically downward through the inside of a coating section storing a matrix resin to apply the matrix resin to the reinforcing fiber sheet to obtain a matrix resin-impregnated reinforcing fiber sheet; and heating the matrix resin-impregnated reinforcing fiber sheet in a noncontact manner;
wherein the coating section includes a liquid pool and a narrowed section which are in communication with each other, wherein the liquid pool has a portion whose cross-sectional area decreases continuously along a running direction of the reinforcing fiber sheet, and wherein the narrowed section has a slit-like cross-section and has a smaller cross-sectional area than the area of the top side of the liquid pool;
wherein the noncontact heating is started within a region of 1 m from the opening of the narrowed section in the running direction of the matrix resin-impregnated reinforcing fiber sheet; and
wherein the below-mentioned Formula 1 is satisfied assuming that the surface temperature of the matrix resin-impregnated reinforcing fiber sheet is P2 (° C.) at the completion point of the heating and that the temperature of the matrix resin stored in the inside of the coating section is M (° C.), $$M \leq P2 \qquad \text{(Formula 1)}.$$

In addition, provided is a method of producing a prepreg, including:
allowing a reinforcing fiber sheet to pass substantially vertically downward through the inside of a coating section storing a matrix resin to obtain a matrix resin-impregnated reinforcing fiber sheet in which the matrix resin is applied to the reinforcing fiber sheet; and
carrying out an additional-impregnation process which at least presses the matrix resin-impregnated reinforcing fiber sheet;
wherein the coating section includes a liquid pool and a narrowed section which are in communication with each other, wherein the liquid pool has a portion whose cross-sectional area decreases continuously along a running direction of the reinforcing fiber sheet, and wherein the narrowed section has a slit-like cross-section and has a smaller cross-sectional area than the top side of the liquid pool;
wherein the distance N from the outlet of the coating section to the starting point of the pressing in the additional-impregnation process is 1 m or less; and
wherein the surface temperature P (° C.) of the matrix resin-impregnated reinforcing fiber sheet before the additional-impregnation process satisfies the relationship of Formula 2 with the temperature M (° C.) of the matrix resin stored in the coating section, $$M - 30 \leq P \qquad \text{(Formula 2)}.$$

In addition, provided is a method of producing a prepreg, the method characterized by including: allowing a reinforcing fiber sheet to pass vertically downward through a coating section to apply a matrix resin to the reinforcing fiber sheet;
wherein the coating section includes:
a liquid pool storing the matrix resin and having a portion whose cross-sectional area continuously decreases vertically downward;
a narrowed section having a slit-like outlet in communication with the lower end of the liquid pool; and
one or more bars included in the liquid pool and extending in the longitudinal direction of the slit-like outlet; and
wherein the reinforcing fiber sheet is withdrawn from the narrowed section while the reinforcing fiber sheet is brought in contact with the bar(s) such that the holding angle(s) formed between the bar(s) and said reinforcing fiber sheet is/are all 10° or more and 40° or less.

In addition, the method of producing a prepreg tape according to the present invention is characterized by including slitting a prepreg obtained by the above-mentioned method of producing a prepreg.

In addition, the method of producing a fiber reinforced composite material according to the present invention is characterized by including curing a prepreg obtained by the above-mentioned method of producing a prepreg or a prepreg tape obtained by the above-mentioned method of producing a prepreg tape.

The method of producing a prepreg according to the present invention or the prepreg production apparatus according to the present invention makes it possible to significantly suppress and prevent clogging with fuzz. Furthermore, the method enables the reinforcing fiber sheet to be run continuously at a high speed, and makes it possible to enhance the productivity of the reinforcing fiber sheet provided with a matrix resin and obtain a prepreg impregnated with the matrix resin uniformly.

BRIEF DESCRIPTION OF DRAWINGS

FIG. 6b is a cross-sectional view depicting the stream of the matrix resin 2 in the clearance gap 26 in FIG. 6a.

DETAILED DESCRIPTION OF EMBODIMENTS OF THE INVENTION

Preferred embodiments of the present invention will be described with reference to the drawings. In this regard, the following description illustrates embodiments of the present invention, the present invention is not to be construed to be limited to the embodiments, and various modifications can be made to the invention to the extent that they do not depart from the object and effect of the present invention.

<Outline of Method of Producing Prepreg>

The present invention discloses three novel methods of producing a prepreg. These production methods are the same in that allowing a reinforcing fiber sheet to pass substantially vertically downward through the inside of a coating section storing a matrix resin affords a matrix resin-impregnated reinforcing fiber sheet in which the reinforcing fiber sheet is provided with the matrix resin. In these production methods, the following three production methods are used to further enhance the degree of impregnation of the resulting prepreg.

Figure 1:
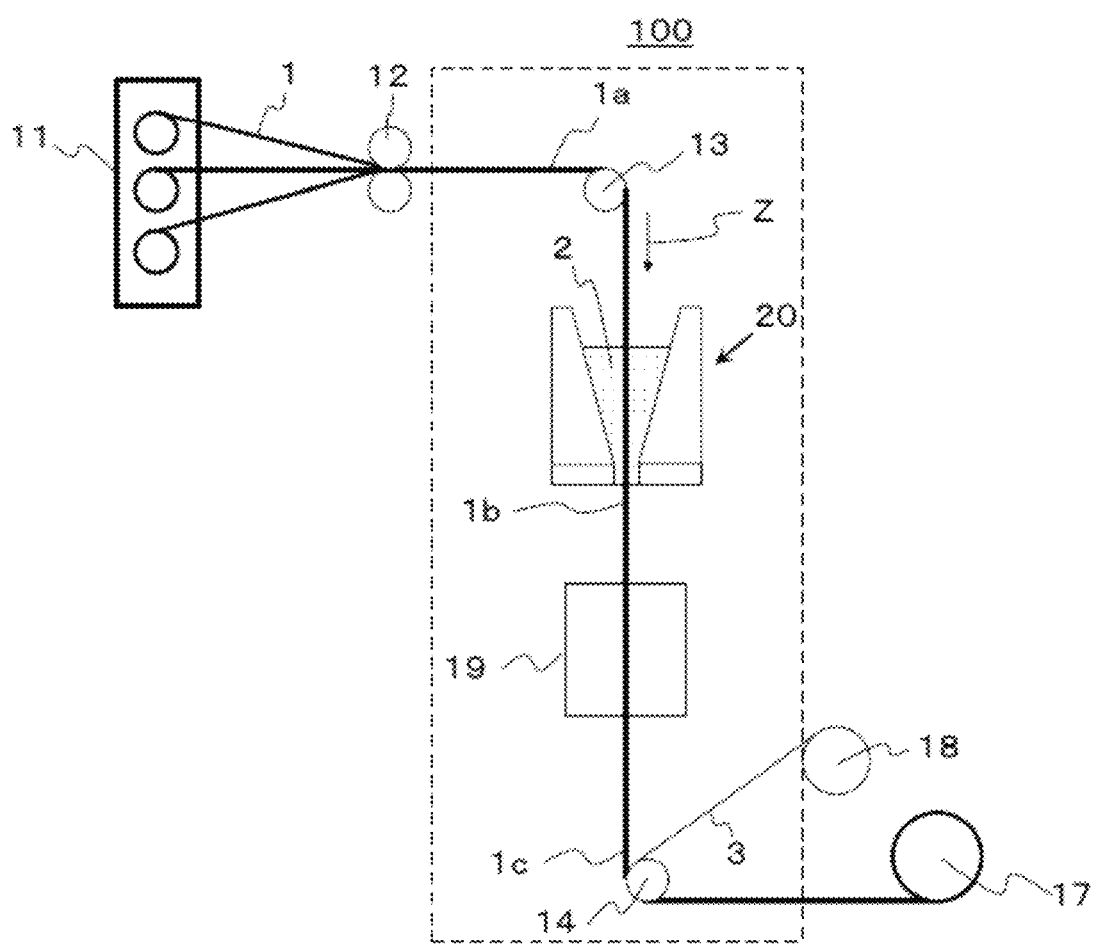
FIG. 1 is a schematic cross-sectional view depicting a method of producing a prepreg in an embodiment of a first production method according to the present invention.

First, a first production method according to the present invention will be outlined with reference to FIG. 1. A coating device 100 includes: conveyance rolls 13 and 14 as a running mechanism for running a reinforcing fiber sheet 1a in the substantially vertically downward direction Z; and a coating section 20 as a coating mechanism that is disposed between the conveyance rolls and stores a matrix resin 2. Also before and after the coating device 100, it is possible to provide a plurality of creels 11 for unwinding reinforcing fibers 1, an arrangement device 12 for obtaining a reinforcing fiber sheet 1a in which the unwound reinforcing fibers 1 are arranged unidirectionally (arranged in the depth direction of the page in FIG. 1), and a wind-up device 17 for a prepreg 1c, and in addition, the coating device 100 is equipped with a supply device for a matrix resin, though the supply device is not shown in the drawing. An additional-impregnation device 19 is further included between the coating section 20 and the conveyance roll 14. In the first production method, this is a noncontact heating device. It is also possible to apply a release sheet 3 to a prepreg 1c which has undergone the additional-impregnation process at the noncontact heating device. In FIG. 1, the release sheet 3 is applied to only one face of the prepreg 1c, but can also be applied to both faces.

Figure 2A:
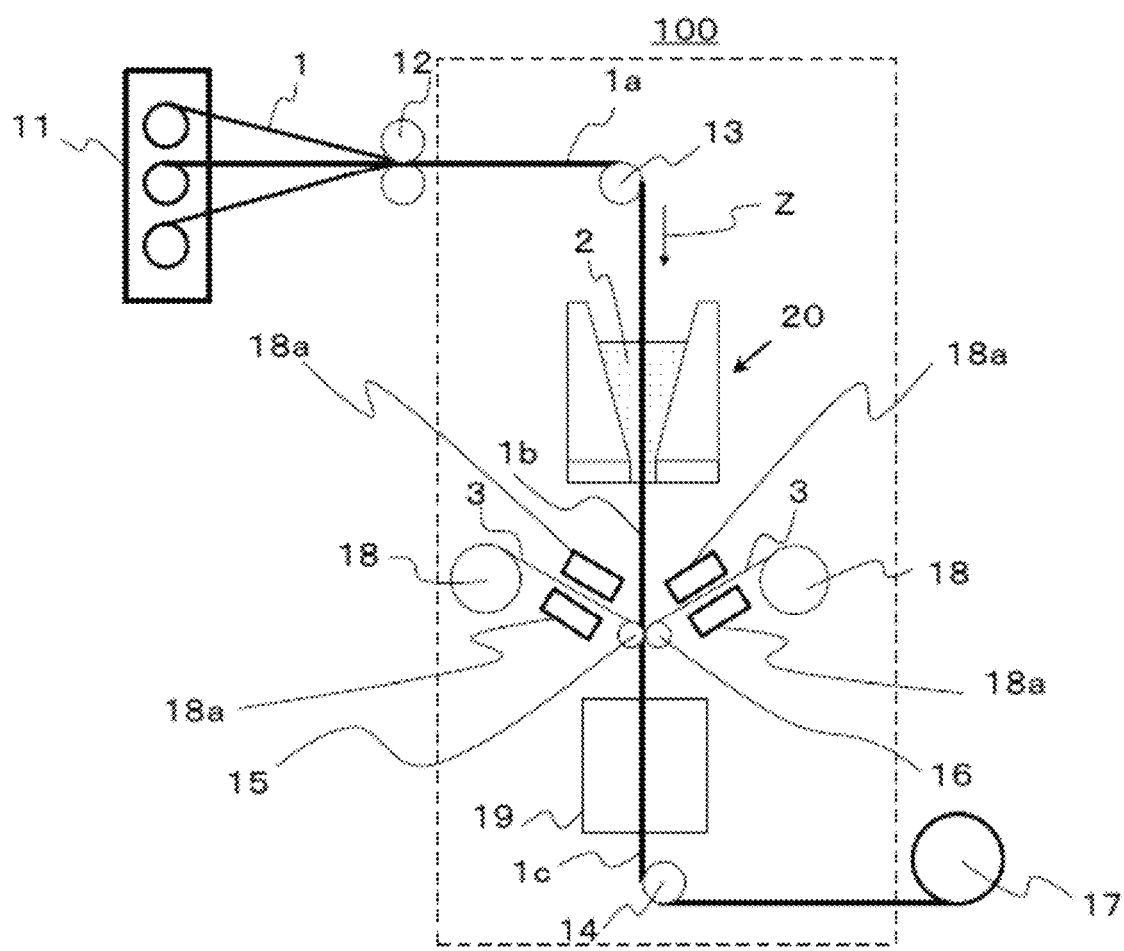
FIG. 2a is a schematic cross-sectional view depicting a method of producing a prepreg in an embodiment of a second production method according to the present invention.

Next, a second production method will be outlined with reference to FIG. 2a. A coating device 100 includes: conveyance rolls 13 and 14 as a running mechanism for running a reinforcing fiber sheet 1a in the substantially vertically downward direction Z; and a coating section 20 as a coating mechanism that is disposed between the conveyance rolls and stores a matrix resin 2. Also before and after the coating device 100, it is possible to provide a plurality of creels 11 for unwinding reinforcing fibers 1, an arrangement device 12 for obtaining a reinforcing fiber sheet 1a in which the unwound reinforcing fibers 1 are arranged unidirectionally (arranged in the depth direction of the page in FIG. 2), and a wind-up device 17 for a prepreg 1c, and in addition, the coating device 100 is equipped with a supply device for a matrix resin, though the supply device is not shown in the drawing. An additional-impregnation device 19 is further included between the coating section 20 and the conveyance roll 14. The matrix resin-impregnated reinforcing fiber sheet 1b can also be provided with the release sheet 3 when introduced into the additional-impregnation device 19. In this case, it is possible to include a release sheet supply device 18 that supplies a release sheet 3 to both faces of a matrix resin-impregnated reinforcing fiber sheet 1b obtained immediately under the coating section 20. The matrix resin-impregnated reinforcing fiber sheet 1b can also be introduced and provided with the release sheet 3 using a conveyance roll 15 and a conveyance roll 16. FIG. 2a shows that the release sheet 3 is being applied to each of both faces of the matrix resin-impregnated reinforcing fiber sheet 1b, but the release sheet 3 may be applied to one face. Furthermore, it is also possible to include a release sheet heating device 18a or heating the release sheet 3. FIG. 1 shows that the release sheet heating device 18a is heating both faces of the release sheet 3, but the device may heat only one face. Furthermore, FIG. 2a shows that a heating device in non-contact with the release sheet 3 is used as the release sheet heating device 18a, but a contact type of heating device may be used.

Figure 3:
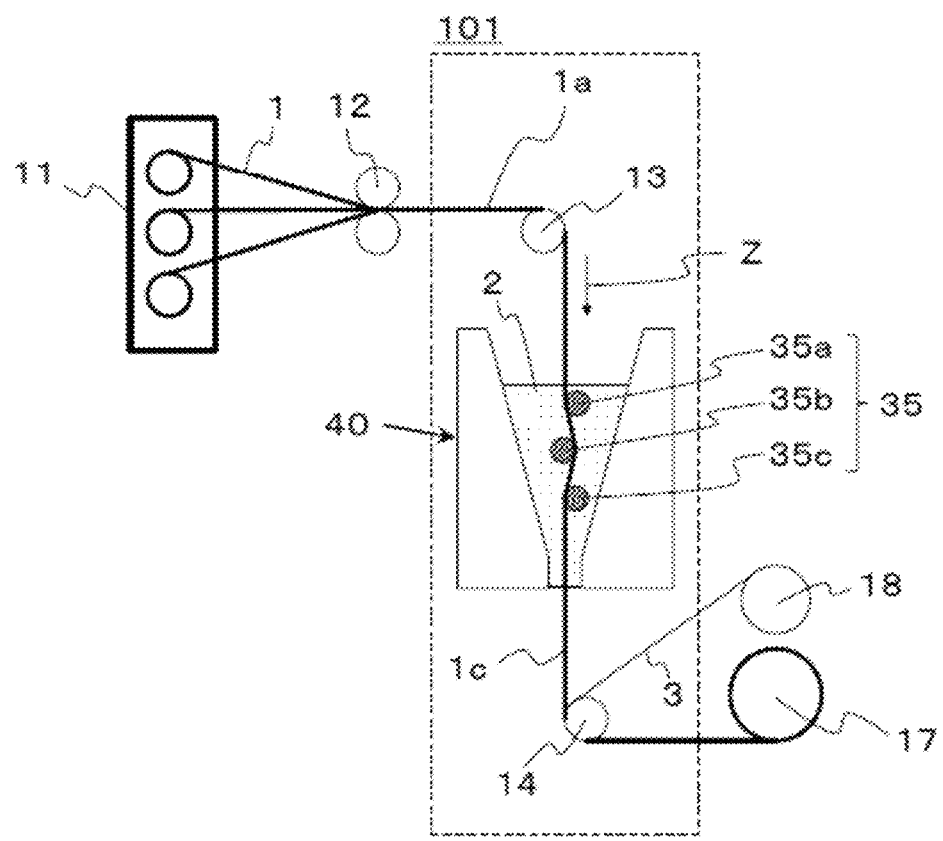
FIG. 3 is a schematic cross-sectional view depicting a method of producing a prepreg in an embodiment of a third production method according to the present invention.

Next, a third production method will be outlined with reference to FIG. 3. A coating device 101 includes: conveyance rolls 13 and 14 as a running mechanism for running a reinforcing fiber sheet 1a in the substantially vertically downward direction Z; and a coating section 40 as a coating mechanism that is disposed between the conveyance rolls 13 and 14 and stores a matrix resin 2. The coating section 40 includes, therein, a group of bars 35 (35a, 35b, and 35c) extending in the depth direction in the page. Also before and after the coating device 101, it is possible to provide a plurality of creels 11 for unwinding reinforcing fibers 1, an arrangement device 12 for obtaining a reinforcing fiber sheet 1a in which the unwound reinforcing fibers 1 are arranged unidirectionally (arranged in the depth direction of the page in FIG. 3), and a wind-up device 17 for a prepreg 1c, and in addition, the coating device 100 is equipped with a supply device for a matrix resin, though the supply device is not shown in the drawing. In addition, the coating device 101 can be equipped with a release sheet supply device 18 for supplying a release sheet 3, if necessary. In FIG. 3, the release sheet 3 is applied to only one face of the prepreg 1c, but can also be applied to both faces.

<Reinforcing Fiber Sheet>

Here, examples of the reinforcing fiber 1 include carbon fibers, glass fibers, metal fibers, metal oxide fibers, metal nitride fibers, organic fibers (aramide fibers, polybenzoxazole fibers, polyvinyl alcohol fibers, polyethylene fibers, and the like), and the like, and carbon fibers are preferably used, from the viewpoint of the mechanical property and lightness of FRP.

Examples of the reinforcing fiber sheet 1a used in the present invention include a unidirectionally arranged UD base material and a reinforcing fiber fabric as a woven fabric.

A unidirectionally arranged UD base material as the reinforcing fiber sheet 1a refers to a plurality of reinforcing fibers arranged unidirectionally in a plane, and the plurality of reinforcing fibers do not necessarily have to be integrated, for example, by intertangling. That is, the reinforcing fiber sheet is termed so for convenience to represent a state in which the reinforcing fibers are arranged, because the production method according to the present invention makes it possible that a sheet-like object impregnated with a matrix resin is obtained when the object has been coated with the matrix resin. Here, the reinforcing fiber sheet is not limited to any one having a particular thickness or width, and the thickness and the width can suitably be selected in accordance with the purpose or application. In the case of carbon fiber, usually approximately 1,000 to 1,000,000 single fibers assembled in tape form are called a "tow", and such tows can be arranged to obtain a reinforcing fiber sheet, but tows may be laminated in the thickness direction. In this regard, the reinforcing fiber sheet is easy to handle and accordingly preferable when the aspect ratio defined using the width and thickness is 10 or more. In the present invention, one tape-like "tow" is understood to be one form of the reinforcing fiber sheet.

In addition, the method used to form a reinforcing fiber sheet 1a may be a known method and is not limited to any particular one, and it is preferable from the viewpoints of process efficiency and arrangement uniformity to preliminarily arrange single fibers to form a reinforcing fiber bundle, followed by further arranging the reinforcing fiber bundle to form a reinforcing fiber sheet 1a. For example, in the case of carbon fiber, a "tow" that is a tape-like reinforcing fiber bundle is wound on a bobbin as above-mentioned, and a reinforcing fiber sheet as a UD base material can be obtained by arranging the tape-like reinforcing fiber bundle withdrawn from the bobbin. In addition, it is preferable to have an arrangement mechanism for orderly arranging reinforcing fiber bundles withdrawn from the bobbins fit onto the creels so that there can be no undesirable overlapping nor folding in the reinforcing fiber bundles in the reinforcing fiber sheet and no split between the reinforcing fiber bundles. As a reinforcing fiber arrangement mechanism, a known roller, a comb type of arrangement device, or the like can be used. In addition, layering a plurality of preliminarily arranged reinforcing fiber sheets is useful from the viewpoint of decreasing splits between the reinforcing fibers. In this regard, the creels are preferably provided with a tension control mechanism operated when the reinforcing fibers are withdrawn. As a tension control mechanism, a known one can be used, and examples thereof include a braking mechanism. In addition, tension can also be controlled, for example, by adjusting a yarn guide.

A reinforcing fiber fabric as a reinforcing fiber sheet in the present invention refers to a sheet formed from multiaxially or randomly arranged reinforcing fibers. Specific examples thereof include not only woven fabrics, knitted fabrics, and the like but also two-dimensionally and multiaxially arranged reinforcing fibers and randomly oriented reinforcing fibers such as non-woven fabrics, mats, and paper. In this case, the reinforcing fiber can be formed into a sheet by utilizing a method such as binder-providing, interlacing, welding, or fusing. Examples of woven fabrics that can be used include not only basic fabric structures such as plain weaves, twill, satin, and non-crimp fabrics but also bias structures, leno weaves, multiaxially woven fabrics, multi-woven fabrics, and the like. In a woven fabric formed by combining a bias structure and a UD base material, not only the UD structure inhibits the woven fabric from being deformed by a tension in a coating and impregnating process, but also the bias structure also causes quasi-isotropy, and thus, is a preferable form. In addition, a multi-woven fabric is advantageous in that the upper face and/or lower face of the woven fabric and the structure and properties of the inside of the woven fabric can be designed separately. A preferable knitted fabric is warp knitting taking into consideration the shape stability in the coating and impregnating process, and it is also possible to use braid which is circular knitting.

The thickness of the reinforcing fiber fabric is not limited to any particular value provided that the value is within a range enabling the effects of the present invention to be obtained. The thickness needs only to be determined taking into consideration the required FRP performance and stability of the coating process. The thickness is preferably 1 mm or less, more preferably 0.3 mm or less, taking into consideration the passability through the narrowed section.

A reinforcing fiber fabric suitable in accordance with the purpose is commercially available on the market or can be produced, and examples thereof are listed as below-mentioned. Examples of woven fabrics include: "TORAYCA®" cloth C06142, C06347B, C05642, and the like, manufactured by Toray Industries, Inc.; and woven fabrics manufactured by Hexcel Corporation, including: "HexForce®" Fabrics and "PrimeTex®", such as 84, G0801, XAGP282P, 43195, G0939, G0803, 43364, XSGP196P, SGP203CS, XC1400, 48200, 48287, and 46150; "Injetex®" Fabrics, such as GB201, G0986, and G0926; hybrid fabrics of carbon fiber and glass fiber, such as G1088, G0874, G0973, and 43743; aramide fiber fabrics, such as 20796 and 21263; and Quartz woven fabrics, such as 610 and 593. Examples of non-woven fabrics, mats, and paper include "TORAYCA®" mat B030, B050, BV03, and the like, manufactured by Toray Industries, Inc.; "CARBOLIGHT®" CEO-030, CBP-030, ZX-020, and the like, manufactured by Oribest Co., Ltd.; and the like.

<Smoothing of Reinforcing Fiber Sheet>

In the present invention, increasing the surface smoothness of the reinforcing fiber sheet can enhance the uniformity of the coating amount in the coating section. For this reason, the reinforcing fiber sheet is preferably introduced into the liquid pool after it is smoothed. The smoothing treatment method is not limited to a particular one, and examples thereof include a method in which physical pressure is applied using opposing rolls or the like and a method in which reinforcing fibers are moved using air flow. A method in which physical pressure is applied is easy and convenient, less likely to disturb the arrangement of the reinforcing fibers, and accordingly preferable. More specifically, calendering or the like can be used. The method in which air flow is used not only is less likely to cause abrasion but also has the effect of widening a reinforcing fiber sheet, and accordingly, is preferable.

<Widening of Reinforcing Fiber Sheet>

In the present invention, it is also preferable from the viewpoint of enabling a thin prepreg to be produced efficiently that the reinforcing fiber sheet is introduced into the liquid pool after it is treated for widening of the fiber bundle. The treatment method of widening of the fiber bundle is not limited to a particular one, and examples thereof include a method in which vibration is applied mechanically, a method in which the reinforcing fiber bundle is expanded using air flow, and the like. Examples of methods in which vibration is applied mechanically include a method in which a reinforcing fiber sheet is brought in contact with vibrating rolls, as described, for example, in JP 2015-22799 A. As to the vibration direction, vibration is preferably applied in the Y-axis direction (horizontal direction) or the Z-axis direction (vertical direction), assuming that the running direction of the reinforcing fiber sheet is the X-axis. It is also preferable to use a combination of the horizontally vibrating rolls and the vertically vibrating rolls. In addition, providing a plurality of projections on the surface of the vibration roll makes it possible to suppress abrasion of the reinforcing fiber on the roll, and accordingly is preferable. As a method in which air flow is used, for example, a method described in SEN-I GAKKAISHI, vol. 64, P-262-267 (2008) can be used.

<Preheating of Reinforcing Fiber Sheet>

In the present invention, introducing the reinforcing fiber sheet into the liquid pool after heating the sheet suppresses a decrease in the temperature of the matrix resin and enhances the viscosity uniformity of the matrix resin, and accordingly, is preferable. The reinforcing fiber sheet is preferably heated up to or to the vicinity of the temperature of the matrix resin, and examples of various heating means that can be used for this purpose include air heating, infrared heating, far-infrared heating, laser heating, contact heating, heat medium heating (steam), and the like. Among others, an infrared heating device is easy and convenient and can directly heat the reinforcing fiber sheet, and accordingly, can achieve efficient heating up to a desired temperature even at a high running speed, and is preferable.

<Matrix Resin>

A matrix resin used in the present invention can be used as a resin composition containing any of the below-mentioned various resins, particles, hardeners, and further containing any of various kinds of additives. A prepreg obtained according to the present invention is in a state in which a reinforcing fiber sheet is impregnated with a matrix resin, and the reinforcing fiber sheet can be directly laminated and molded as a sheet-like prepreg to afford members composed of FRP. The degree of impregnation can be controlled in accordance with the design of the coating section and through an additional-impregnation process carried out after coating. A matrix resin can suitably be selected in accordance with the application, and a thermoplastic resin or thermosetting resin is generally used. The matrix resin may be a molten resin melted by heating or a matrix resin which is a matrix resin at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the principal chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PAEK, and the like are suitable. On the other hand, in industrial and automobile applications, PA, polyester, PPS, a polyolefin such as polypropylene (PP), and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends/alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines and which are typified by tetraglycidyl diaminodiphenylmethane are most suitable for the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzoic acid ester types are, suitable. According to specific description, dicyandiamide provides excellent storage stability of prepreg, and accordingly, is used by preference. In addition, various isomers of diaminodiphenyl sulfone afford cured objects having good heat resistance, and accordingly, are most suitable for the present invention. As amino benzoic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, from the viewpoint of enhancing the pot life of a matrix resin.

In the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics: that is, a thermosetting resin is generally disadvantageouly brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than 50 mass % thermosetting resin, from the viewpoint of the mechanical property of FRP obtained by curing prepreg.

<Polymer Particle>

In the present invention, use of a matrix resin containing polymer particles is also preferable because the use can enhance the toughness and impact resistance of the obtained CFRP. In this case, the glass transition temperature (Tg) or melting temperature (Tm) of polymer particles which is 20° C. or more higher than the temperature of a matrix resin makes it easier to retain the form of the polymer particle in the matrix resin, and accordingly is preferable. The Tg of polymer particles can be measured under the following conditions using a temperature-modulated DSC. As a temperature-modulated DSC device, Q1000 manufactured by TA Instruments, Inc. is suitable, and this can be used on the basis of calibration carried out using high-purity indium under a nitrogen atmosphere. The measurement conditions can be based on a temperature ramp rate of 2° C./min., and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./min., and the temperature at the peak top of the peak-shaped signal corresponding to melting is regarded as Tm.

In addition, the polymer particles are preferably insoluble in a matrix resin, and as such polymer particles, suitable ones described in, for example, WO2009/142231 as a reference can be used. More specifically, polyamides and polyimides can be preferably used, and polyamides that have excellent toughness and accordingly can significantly enhance the impact resistance are most preferable. Examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JP H01-104624A. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol®" 1002D, 2001UD, 2001EXD, 2002D, 3202D, 3501D, 3502D (which are all manufactured by Arkema K.K.), "Grilamid®" TR90 (manufactured by Emser Werke, Inc.), "TROGAMID®" CX7323, CX9701, CX9704 (manufactured by Degussa AG), and the like. These polyamide particles may be used singly or in combination of two or more kinds thereof.

In addition, polymer particles are preferably retained in the interlayer resin layer of CFRP in order to impart high toughness to the interlayer resin layer. For this, the number average particle size of the polymer particles is preferably in the range from 5 to 50 µm, more preferably in the range from 7 to 40 µm, still more preferably in the range from 10 to 30 µm. Having a number average particle size of 5 µm or more makes it possible that the particles do not intrude into the reinforcing fiber bundle, but are retained in the interlayer resin layer of the obtained fiber reinforced composite material. Having a number average particle size of 50 µm or less makes it possible that the thickness of the matrix resin layer on the surface of the prepreg is made suitable, and eventually that the fiber mass content in the obtained CFRP is made suitable.

<Viscosity of Matrix Resin being Applied>

A matrix resin used in the present invention preferably has an optimal viscosity selected from the viewpoint of processability and stability. Specifically, it is preferable that the matrix resin being applied has a viscosity in the range from 1 to 60 Pa·s because such a viscosity makes it possible that drip of the liquid at the outlet of the narrowed section is suppressed and that the high-speed running properties and stable running properties of the reinforcing fiber sheet are enhanced. As used herein, a viscosity refers to one measured at a strain rate of $3.14\ s^{-1}$ at a matrix resin temperature in the liquid pool. As a measurement device, a viscoelasticity measurement device such as of a parallel disc type or a conical type can be used.

<Coating Step>

A step in which a UD base material is used as a reinforcing fiber sheet will be described with reference to FIG. 1. The method of providing the reinforcing fiber sheet 1a with the matrix resin 2 in the coating device 100 is a method in which a plurality of the reinforcing fibers 1 unwound from the creels 11 are arranged unidirectionally (in the depth direction of the page) through the arrangement device 12 to obtain the reinforcing fiber sheet 1a, and then, the reinforcing fiber sheet 1a is allowed to pass through the coating section 20 in the substantially vertically downward direction Z to provide both faces of the reinforcing fiber sheet 1a with the matrix resin 2. This makes it possible to obtain a matrix resin-impregnated reinforcing fiber sheet 1b. In this regard, in cases where a reinforcing fiber fabric is used, it is only necessary to replace the creel 11 in FIG. 1 with an unwinding device for a reinforcing fiber fabric and replace an arrangement device 12 in FIG. 1 with nip rolls so that the fabric can be withdrawn. A prepreg 1c can be obtained by further allowing the matrix resin-impregnated reinforcing fiber sheet 1b to pass through the additional-impregnation device in the first and second production methods or by further allowing the sheet to pass through the coating section in the third production method. The prepreg 1c and the release sheet 3 may be simultaneously wound up using a wind-up device 17. In particular, in cases where part or all of the matrix resin 2 contained in the matrix resin-impregnated reinforcing fiber sheet 1b is still present on the surface of the matrix resin-impregnated reinforcing fiber sheet 1b and has high fluidity and adhesiveness when the matrix resin 2 reaches the conveyance roll 14, the release sheet 3 can prevent the part of the matrix resin 2 on the surface of the matrix resin-impregnated reinforcing fiber sheet 1b from being transferred to the conveyance roll 14. Furthermore, the method can prevent adhesion between parts of the matrix resin-impregnated reinforcing fiber sheet 1b and provides easy handling in the post-process. The release sheet is not limited to a particular one as long as the release sheet achieves the above-mentioned effect, and examples thereof include not only a release paper sheet but also an organic polymer film whose surface is coated with a release agent, and the like.

Figure 4:
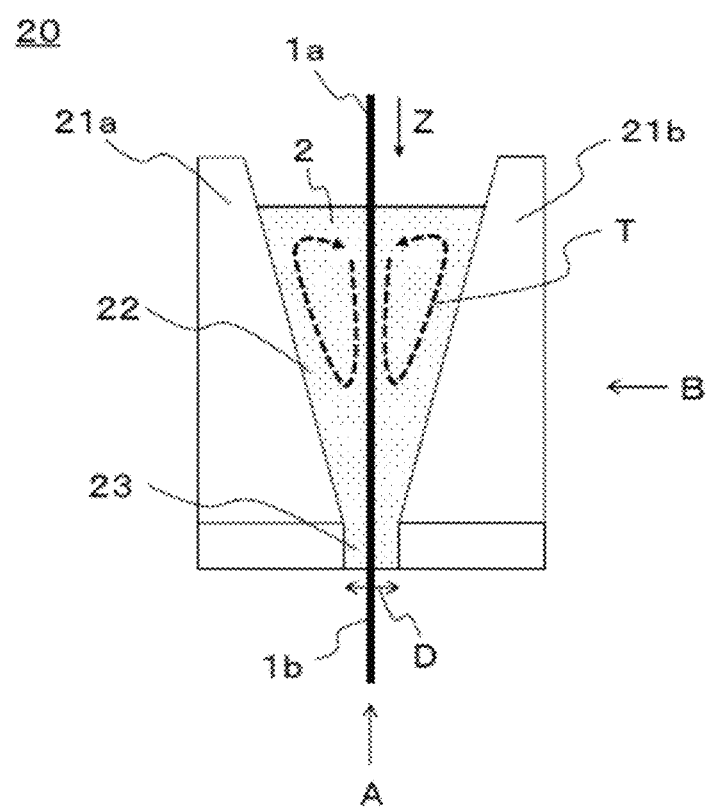
FIG. 4 is an enlarged detail cross-sectional view of the coating section portion in FIG. 1.

Next, with reference to FIGS. 4 to 6, a step of providing the reinforcing fiber sheet 1a with the matrix resin 2 will be described in detail. FIG. 4 is an enlarged detail cross-sectional view of the coating section 20 in FIGS. 1 and 2a. The coating section 20 has wall constituent members 21a and 21b that are opposed to each other with a given gap D in between, and between the wall constituent members 21a and 21b, a liquid pool 22 whose cross-sectional area decreases continuously in the vertically downward direction Z (that is, in the running direction of the reinforcing fiber sheet) and a slit-like narrowed section 23 positioned below the liquid pool 22 (on the discharge side of the reinforcing fiber sheet 1a) and having a cross-sectional area smaller than the cross-sectional area of the top side of the liquid pool 22 (the introduction side of the reinforcing fiber sheet 1a) are formed. In FIG. 4, the reinforcing fiber sheet 1a is arranged in the depth direction of the page.

In the coating section 20, the reinforcing fiber sheet 1a introduced into the liquid pool 22 runs in the vertically downward direction Z, and, at the same time, is accompanied by the matrix resin 2 surrounding the reinforcing fiber sheet. During this, the accompanying matrix resin 2 is gradually compressed, and the pressure of the matrix resin 2 increases toward the lower portion of the liquid pool 22, because the cross-sectional area of the liquid pool 22 decreases in the vertical downward direction Z (in the running direction of the reinforcing fiber sheet 1a). When the pressure in the lower portion of the liquid pool 22 increases, it is more difficult for the accompanying liquid flow to flow toward the lower portion any further, and the accompanying liquid flows in the direction of the wall constituent members 21a and 21b, and then impeded by the wall constituent members 21a and 21b, resulting in flowing upward. As a result, a circular stream T is formed along the plane of the reinforcing fiber sheet 1a and the wall surfaces of the wall constituent members 21a and 21b in the liquid pool 22. Thus, even if the sheet-like reinforcing fiber 1a brings fuzz in the liquid pool 22, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream T, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the reinforcing fiber sheet 1a is run at a high speed, the liquid pressure further increases, and accordingly, the fuzz elimination effect becomes higher. As a result, this makes it possible to provide the reinforcing fiber sheet 1a with the matrix resin 2 at a higher speed, and enhances productivity significantly.

In addition, the increased liquid pressure has the effect of making it easier for the reinforcing fiber sheet 1a to be impregnated with the matrix resin 2. This is based on the property (Darcy's law) according to which the degree at which a porous object such as a reinforcing fiber bundle is impregnated with a matrix resin is increased by the pressure of the matrix resin. This can also enhance the impregnation effect because running the reinforcing fiber sheet 1a at a higher speed increases the liquid pressure further. In this regard, the matrix resin 2 is impregnated through gas-liquid replacement with bubbles remaining in the reinforcing fiber sheet 1a, and the bubbles are discharged from the gaps in the reinforcing fiber sheet 1a by the liquid pressure and ascending force in the orientation direction (in the vertically upward direction) of the fibers. Here, the bubbles are discharged without pushing away the in-coming matrix resin 2 for impregnation, and accordingly, also has the effect of not inhibiting impregnation. In addition, part of the bubbles are discharged in the out-of-plane direction (in the normal direction) from the surface of the reinforcing fiber sheet 1a, and the bubbles are eliminated rapidly by the liquid pressure and ascending force in the vertically upward direction, and accordingly, are not retained in that lower portion of the liquid pool 22 which affords a high impregnation effect, whereby the effect of promoting the discharge of the bubbles efficiently is also achieved. These effects enable the reinforcing fiber sheet 1a to be efficiently impregnated with the matrix resin 2, and, as a result, make it possible to obtain a high quality prepreg 1b impregnated uniformly with the matrix resin 2.

Further, the increased liquid pressure allows the reinforcing fiber sheet 1a to be automatically aligned with the center of the gap D, and the reinforcing fiber sheet 1a is not directly abraded against the wall surfaces of the liquid pool 22 and the narrowed section 23, whereby the effect of suppressing the generation of fuzz here is also achieved. This is because, when any external disturbance or the like causes the reinforcing fiber sheet 1a to approach either side in the gap D, the matrix resin 2 is pushed and compressed in the resulting narrower gap on the approached side, and accordingly, the liquid pressure further increases on the approached side, pushing the reinforcing fiber sheet 1a back to the center of the gap D.

The narrowed section 23 is designed to have a smaller cross-sectional area than the top side of the liquid pool 22. As understood from FIG. 4 and FIG. 6a, the smaller cross-sectional area is simply due to the fact that the length in the direction perpendicular to the pseudo-plane of the reinforcing fiber sheet is smaller, that is, the distance between the wall constituent members is narrower. This is intended to achieve the impregnation effect and the automatic alignment effect through increasing the liquid pressure in the narrowed section as above-mentioned. In addition, the cross-sectional shape of the uppermost face of the narrowed section 23 is preferably made to conform to the cross-sectional shape of the lowermost face of the liquid pool 22, from the viewpoint of the running properties of the reinforcing fiber sheet 1a and the flow control of the matrix resin 2, but, if necessary, the cross-sectional shape of the uppermost face of the narrowed section 23 may be made slightly larger.

In this respect, the reinforcing fiber sheet 1a in the coating section 20 in FIG. 4 runs in the completely vertically downward direction Z (at 90 degrees to the horizontal face), but, without limitation to this, may run in the substantially vertically downward direction to the extent that the fuzz collection effect and the bubbles discharge effect can be obtained, and that the reinforcing fiber sheet 1a can run stably and continuously.

In addition, the total amount of the matrix resin 2 applied to the reinforcing fiber sheet 1a can be controlled in the gap D in the narrowed section 23. For example, in cases where the total amount of the matrix resin 2 applied to the reinforcing fiber sheet 1a is desired to be larger (the areal weight is desired to be larger), the wall constituent members 21a and 21b may be disposed in such a manner that the gap D is wider.

Figure 5:
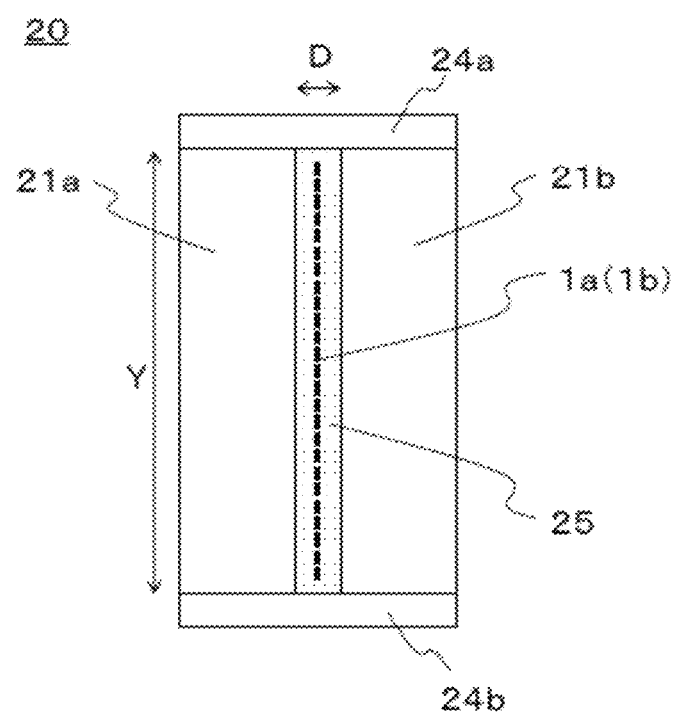
FIG. 5 is a bottom side view of the coating section in FIG. 4, as viewed in the direction A in FIG. 4.

FIG. 5 is a bottom side view of the coating section 20, as viewed in the direction A in FIG. 4. In the coating section 20, side wall members 24a and 24b are provided to prevent the matrix resin 2 from leaking by both ends of the reinforcing fiber sheet 1a in the arrangement direction, and the outlet 25 of the narrowed section 23 is formed in the space surrounded by the wall constituent members 21a and 21b and the side wall members 24a and 24b. Here, the outlet 25 is slit-like, and the cross-sectional aspect ratio (Y/D in FIG. 3) may be set in accordance with the shape of the reinforcing fiber sheet 1a which is desired to be provided with the matrix resin 2.

Figure 6A:
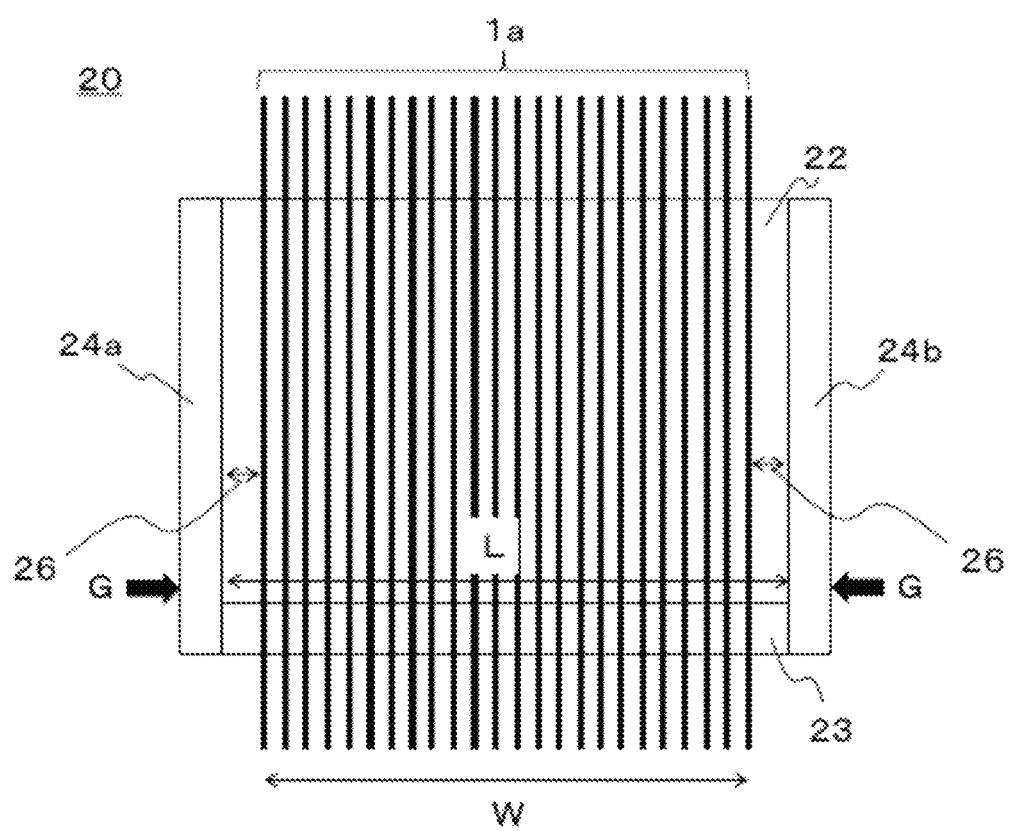
FIG. 6a is a cross-sectional view depicting the structure of the inside of the coating section in FIG. 4, as viewed in the direction B in FIG. 4.

FIG. 6a is a cross-sectional view depicting the structure of the inside of the coating section 20, as viewed in the direction B. Here, to make the view easier to see, the wall constituent member 21b is omitted, and in addition, the reinforcing fiber sheet 1a is depicted as if the reinforcing fibers 1 are arranged with a clearance between the fibers, but, in reality, it is preferable to arrange the reinforcing fibers 1 with no clearance between the fibers, from the viewpoint of the grade of the sheet-like prepreg and the mechanical property of FRP.

Figure 6B:
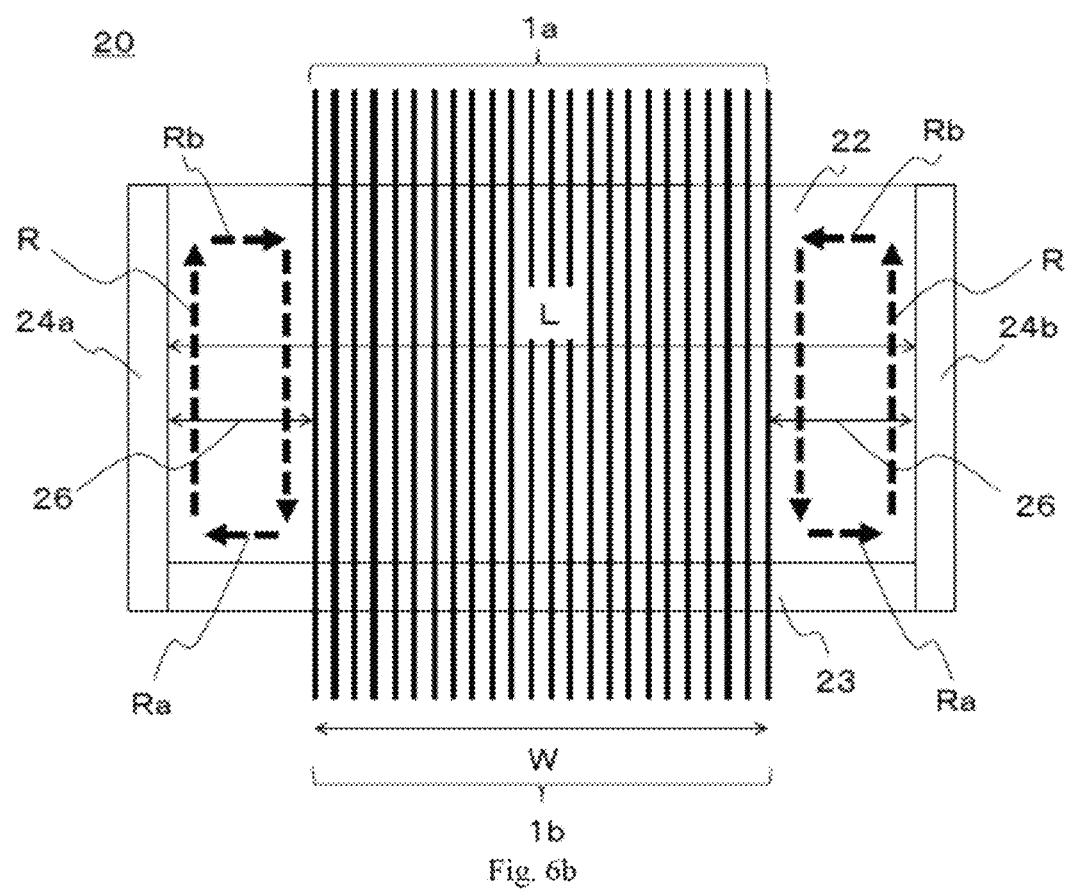

FIG. 6b depicts the stream of the matrix resin 2 in the clearance gap 26. When the clearance gap 26 is large, a circular stream R of the matrix resin 2 in the edge is generated in the depicted direction. This circular stream R in the edge becomes an outward flow (Ra) in the lower portion of the liquid pool 22, and accordingly, results in tearing apart the reinforcing fiber sheet (causing split of the sheet-like fiber bundle) or expanding the distance between the reinforcing fibers, and because of this, there is a possibility that arrangement nonuniformity is caused in the reinforcing fibers in the resulting reinforcing fiber sheet prepreg. On the other hand, the circular stream R becomes an inward flow (Rb) in the upper portion of the liquid pool 22, and accordingly, the reinforcing fiber sheet 1a is compressed in the width direction, resulting in edge folding of the reinforcing fiber sheet in some cases. In a device, such as typified by Patent Literature 2 (JP3252278B2), for coating both faces of an integrated sheet-like base material (particularly, a film) with a matrix resin, such a circular stream as caused in the edge in the clearance gap 26 affects the quality insignificantly, and accordingly, has attracted no attention.

In view of this, width regulation for making the clearance gap 26 smaller is carried out in the present invention, whereby the generation of the circular stream in the edge is preferably suppressed. Specifically, the width L of the liquid pool 22, that is, the distance L between the side plate members 24a and 24b is preferably adapted to satisfy the below-mentioned relationship with the width W of the reinforcing fiber sheet measured immediately under the narrowed section 23.

$L \leq W+10$ (mm)

This suppresses the generation of a circular stream in the edge and makes it possible to suppress split and edge folding of the reinforcing fiber sheet 1a and to obtain the prepreg 1b in which the reinforcing fibers 1 are uniformly arranged over the full width (W) of the prepreg 1b and which is of high grade and has high stability. Furthermore, this technology applied to a prepreg can not only enhance the grade and quality of the prepreg but also enhance the mechanical property and quality of FRP obtained using the prepreg. The relationship between L and W is more preferably $L \leq W+2$ (mm), and thus, the split and edge folding of the reinforcing fiber sheet can further be suppressed.

In addition, it is preferable to make adjustments so that the lower limit of L is equal to or greater than W−5 (mm), from the viewpoint of enhancing the uniformity of the dimension in the width direction of the prepreg 1b.

In this regard, this width regulation is preferably carried out at least in the lower portion of the liquid pool 22 (the G position in FIG. 6a), from the viewpoint of suppressing the generation of the circular stream R in the edge due to a high liquid pressure in the lower portion of the liquid pool 22. Furthermore, this width regulation is more preferably carried out in the whole region of the liquid pool 22, whereby the generation of the circular stream R in the edge can be suppressed substantially completely, and, as a result, the split and edge folding of the reinforcing fiber sheet can be suppressed substantially completely.

In addition, the width regulation may be carried out only to the liquid pool 22 if it is carried out only from the viewpoint of suppressing the circular stream in the edge in the clearance gap 26, but it is preferable to carry out the width regulation also to the narrowed section 23 in the same way, from the viewpoint of suppressing excessive application of the matrix resin 2 to the sides of the prepreg 1b.

In the third production method according to the present invention, the coating step is basically the same as in the first and second production methods, but the third production method is characterized in that impregnation is advanced by one or more bars mounted in the coating section. This will be described in detail below.

Referring to FIG. 3, a reinforcing fiber sheet 1a is brought in contact with a group of bars 35 in the coating section 20, wherein the bars extend in the depth direction in the page. Bubbles contained in the inside of the reinforcing fiber sheet 1a are thus squeezed out and discharged, enabling the inside of the reinforcing fiber sheet 1a to be impregnated with a matrix resin more efficiently. If necessary, a release sheet 3 can further be applied to the prepreg 1c in the same manner as in the first and second production methods and then wound up.

Next, the impregnation mechanism in the coating section will be described with reference to FIG. 7. In the coating section 40, the reinforcing fiber sheet 1a introduced into the liquid pool 22 runs in the vertically downward direction Z, and, at the same time, is brought in contact with the bars 35a, 35b, and 35c in this order in the matrix resin 2. When this takes place, the reinforcing fiber sheet 1a is pressed against the bar, the inside of the reinforcing fiber sheet 1a is impregnated with the matrix resin 2 drawn into the split between the reinforcing fiber sheet 1a and the bar, and at the same time, bubbles contained in the reinforcing fiber sheet 1a are discharged out through the opposite face of the reinforcing fiber sheet 1a from the face in contact with the bar in such a manner that the bubbles are squeezed out by the bar. This makes it possible to impregnate the inside of the reinforcing fiber sheet 1a with the matrix resin 2 uniformly. In addition, the bubbles discharged out of the reinforcing fiber sheet 1a move upward by an ascending force, and are further discharged out of the liquid pool 22, and thus, there is no such thing as accumulation of bubbles around the group of bars 35. Furthermore, the reinforcing fiber sheet 1a which has passed through the group of bars 35 runs in the vertically downward direction Z, and, at the same time, is accompanied by the matrix resin 2 surrounding the reinforcing fiber sheet. During this, the accompanying matrix resin 2 is gradually compressed, and the pressure of the matrix resin 2 increases toward the lower portion of the liquid pool 22, because the cross-sectional area of the liquid pool 22 decreases in the vertical downward direction Z (in the running direction of the reinforcing fiber sheet 1a). When the pressure in the lower portion of the liquid pool 22 increases, it is more difficult for the accompanying liquid flow to flow toward the lower portion any further, and the accompanying liquid flows in the direction of the wall constituent members 21a and 21b, and then impeded by the wall constituent members 21a and 21b, resulting in flowing upward. As a result, a circular stream T is formed along the plane of the reinforcing fiber sheet 1a and the wall surfaces of the wall constituent members 21a and 21b in the liquid pool 22. Thus, even if the reinforcing fiber sheet 1a brings fuzz in the liquid pool 22 or even if the contact between the reinforcing fiber sheet 1a and the group of bars 35 generates fuzz, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream T, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the reinforcing fiber sheet 1a is run at a high speed, the liquid pressure further increases, and accordingly, the fuzz elimination effect becomes higher. As a result, this makes it possible to provide the reinforcing fiber sheet 1a with the matrix resin 2 at a higher speed, and enhances productivity significantly.

In addition, the increased liquid pressure has the effect of impregnating the inside of the reinforcing fiber sheet 1a with the matrix resin 2. This is based on the property (Darcy's law) according to which the degree at which a porous object such as a reinforcing fiber bundle is impregnated with a matrix resin is increased by the pressure of the matrix resin. Even if the reinforcing fiber sheet 1a is insufficiently impregnated with the matrix resin 2 at the group f bars 35, the sheet is impregnated with the matrix resin 2 again in the lower section of the liquid pool 22, thus making it possible to obtain a prepreg 1b the degree of impregnation of which is high. In addition, this can also enhance the impregnation effect because running the reinforcing fiber sheet 1a at a higher speed increases the liquid pressure further.

Further, the increased liquid pressure allows the reinforcing fiber sheet 1a to be automatically aligned with the center of the gap D, and the reinforcing fiber sheet 1a is not directly abraded against the wall surfaces of the liquid pool 22 and the narrowed section 23, whereby the effect of suppressing the generation of fuzz here is also achieved. This is because, when any external disturbance or the like causes the reinforcing fiber sheet 1a to approach either side in the gap D, the matrix resin 2 is pushed and compressed in the resulting narrower gap on the approached side, and accordingly, the liquid pressure further increases on the approached side, pushing the reinforcing fiber sheet 1a back to the center of the gap D.

In addition, the total amount of the matrix resin 2 applied to the reinforcing fiber sheet 1a can be controlled in the gap D in the narrowed section 23. For example, in cases where the total amount of the matrix resin 2 applied to the reinforcing fiber sheet 1a is desired to be larger (the areal weight is desired to be larger), the wall constituent members 21a and 21b may be disposed in such a manner that the gap D is wider.

Figure 7:
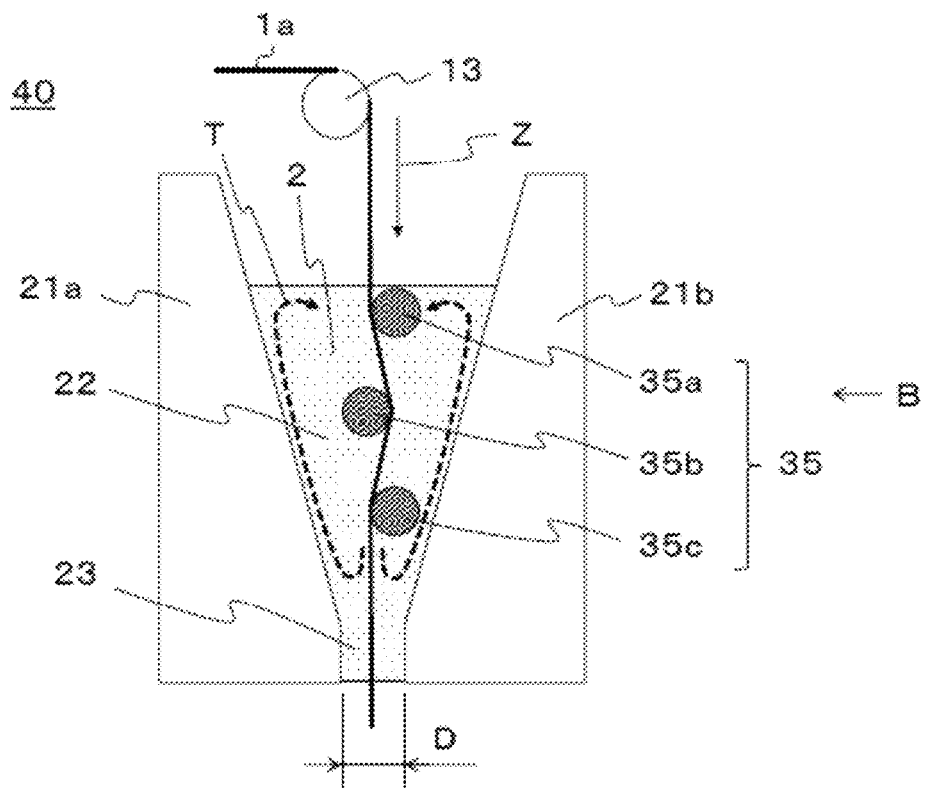
FIG. 7 is an enlarged detail cross-sectional view of the coating section in FIG. 3.

In this respect, the reinforcing fiber sheet 1a in the coating section 40 in FIG. 7 runs partially in the completely vertically downward direction Z (at 90 degrees to the horizontal face), but, without limitation to this, may run in the substantially vertically downward direction to the extent that the fuzz collection effect and the bubbles discharge effect can be obtained, and that the reinforcing fiber sheet 1a can run stably and continuously. In addition, the reinforcing fiber sheet 1a changes in the running direction when brought in contact with the group of bars 35, and this change in the direction needs only to be substantially vertically downward to the extent that the bubbles discharged out of the reinforcing fiber sheet 1a are not accumulated around the group of bars 35.

Next, the arrangement and shape of the bars will be described in detail. FIG. 7 shows an example in which the group of bars 35 in the coating section 40 is composed of three bars, 35a, 35b, and 35c, and the number of bars is not limited to this but needs only to be one or more. In addition, all the bars in the coating section 40 in FIG. 7 are arranged so as to sink inside the matrix resin 2, and, without limitation to this, it is only necessary that at least one or more bars are arranged so as to sink inside the matrix resin 2. However, a larger number of bars in contact with the reinforcing fiber sheet 1a in the matrix resin 2 cause the matrix resin impregnation effect to be higher, and thus, it is preferable that a plurality of bars are arranged so as to sink inside the matrix resin 2.

Figure 8:
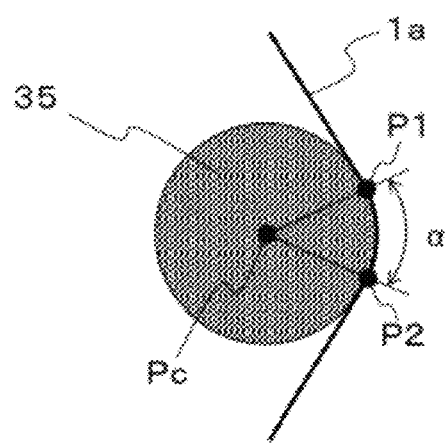
FIG. 8 is a detail cross-sectional view of a reinforcing fiber sheet 1a in contact with a bar 35 in the liquid pool 22.

FIG. 8 is a detail cross-sectional view of a reinforcing fiber sheet 1a in contact with a bar 35 in the matrix resin 2. The reinforcing fiber sheet 1a and the bar 35 are in contact with each other at a holding angle α. Here, the holding angle α refers to an angle made between an arc and the center point Pc of the bar 35, wherein the arc is between the point P1 at which the reinforcing fiber sheet 1a is brought in contact with the bar 35 and the point P2 at which the reinforcing fiber sheet 1a comes off from the bar 35. Here, the larger the holding angle α, the longer the distance along which the reinforcing fiber sheet 1a is in contact with the bar 35, and the more easily the inside of the reinforcing fiber sheet 1a is impregnated with the matrix resin 2 drawn into the split between the reinforcing fiber sheet 1a and the bar 35, but at the same time, the higher the possibility that the reinforcing fiber sheet 1a chafes against the bar 35 to generate fuzz. In particular, if the inside of the reinforcing fiber sheet 1a is completely impregnated with the matrix resin 2 drawn into the split between the reinforcing fiber sheet 1a and the bar 35, thus depleting the matrix resin, the reinforcing fiber sheet 1a chafes directly against the bar 35, and thus causes the possibility of fuzz generation to rapidly become higher. If fuzz is generated and deposited on the face at which the reinforcing fiber sheet 1a is in contact with the bar 35, the running of the reinforcing fiber sheet 1a is disturbed, making it impossible to obtain a uniform prepreg 1b, and thus, the holding angle α formed between the reinforcing fiber sheet 1a and the bar 35 is preferably small sufficiently not to deposit fuzz. Specifically, the holding angle α formed between the reinforcing fiber sheet 1a and the bar 35 is preferably 40° or less, more preferably 20° or less. On the other hand, the holding angle α needs to be 10° or more to achieve sufficient impregnation with the matrix resin.

Figure 9:
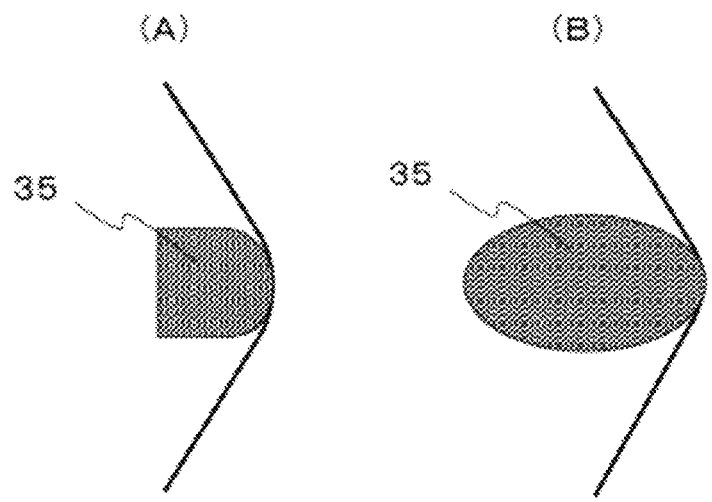
FIG. 9 is a detail cross-sectional view of a bar 35 according to another embodiment.

Here, FIG. 7 shows an example in which the cross-sectional shape of the bar 35 in the coating section 40 is circular, but without limitation to this, the cross-sectional shape of the bar may be other than circular. For example, the shape may be a rectangle having rounded corners as in FIG. 9(A), or an ellipse as in FIG. 9(B). However, from the viewpoint of inhibiting fuzz, the face in contact with the reinforcing fiber sheet 1a preferably does not have any sharp corner and has a smooth curve.

In addition, the inside of the bar 35 does not need to be dense, and the bar may be, for example, a pipe the inside of which is void. In addition, the cross-section of the bar is not limited to any particular diameter (or characteristic length). The larger the diameter of the bar 35, the longer the length along which the reinforcing fiber sheet 1a is in contact with the bar 35. The longer length increases the possibility of fuzz generation, and thus, the diameter is preferably small sufficiently not to cause the bar 35 to be deformed by the tension of the reinforcing fiber sheet 1a. In addition, from the viewpoint of inhibiting the deformation of the bar 35, the material of the bar is preferably a metal having high stiffness, such as stainless steel.

Furthermore, the surface of the bar 35 preferably has a smooth finish. This is intended to make it more unlikely that fuzz is generated when the reinforcing fiber sheet 1a is brought in contact with the bar 35.

Here, using, as the bar 35, a roll rotatable in the coating section 40 also makes it possible to obtain the matrix resin impregnation effect, but bringing the reinforcing fiber sheet 1a in contact with a roll rotatable in the coating section 40 causes part of the reinforcing fiber sheet 1a to be wound around the roll owing to the viscosity of the matrix resin 2, and in some cases, makes it impossible for the reinforcing fiber sheet 1a to run, and thus, the bar 35 is preferably a fixed member which does not rotate.

In addition, FIG. 3 shows that a guide roll (conveyance roll) 13 is provided vertically above the coating section 40 and that the reinforcing fiber sheet 1a running horizontally is brought in contact with the guide roll 13 so as to change its running direction to the vertically downward direction, and then, is guided into the coating section 20. Such a case makes it possible to lower the vertical height of the coating device 100, and is preferable from the viewpoint of decreasing the construction cost of a building in which the coating device 100 is installed.

When this takes place, the bar 35a located at the highest position in the group of bars 35 is preferably brought in contact with the opposite face of the reinforcing fiber sheet 1a from the face brought in contact with the guide roll 13. This is because the perimeter difference of the reinforcing fiber sheet 1a running on the guide roll 13 causes a slight speed difference in the thickness direction, and if the bar 35a is brought in contact with the same face of the reinforcing fiber sheet 1a as the guide roll 13 is, the speed difference is further accumulated, thus causing the reinforcing fiber sheet 1a to become slack in the coating section 40.

<Width Regulation Mechanism>

Figure 10:
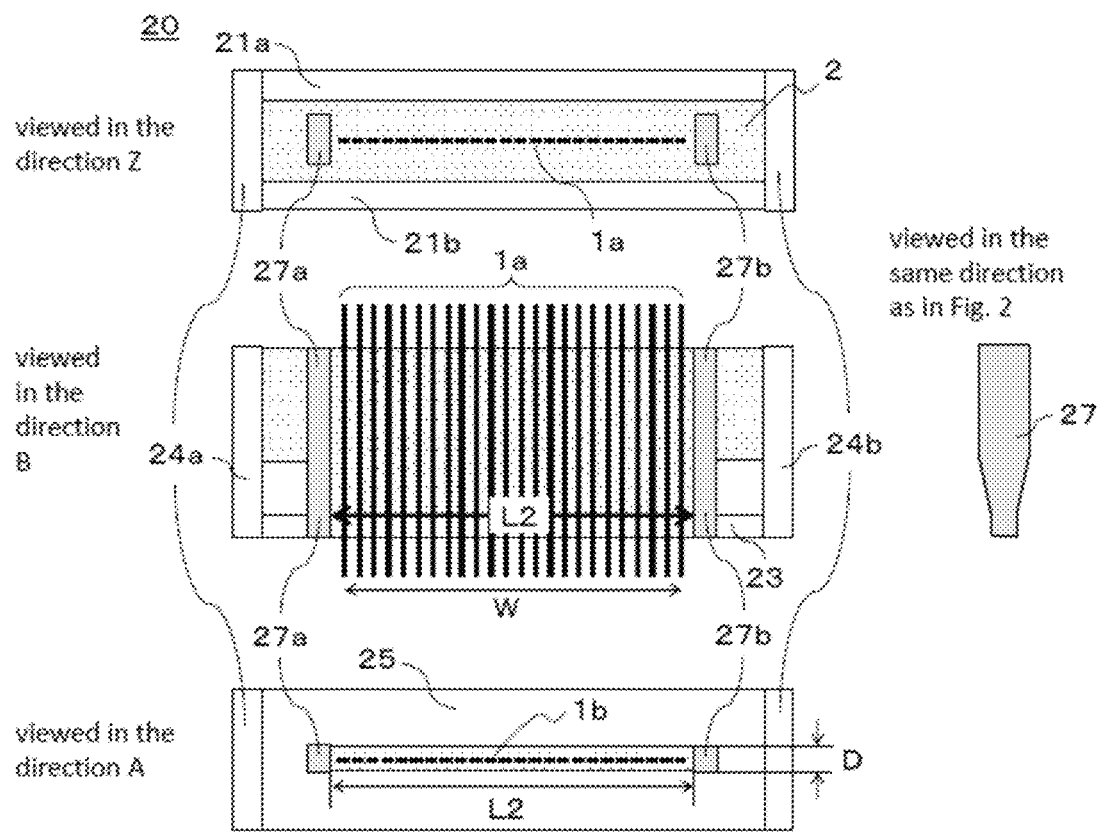
FIG. 10 is a view depicting an installation example of a width regulation mechanism.

In the description of the first production method and the second production method, the above-mentioned has described a case where the side wall members 24a and 24b serve for the purpose of width regulation, but, as shown in FIG. 10, it is also possible to provide width regulation mechanisms 27a and 27b between the side wall members 24a and 24b and to carry out width regulation using such mechanisms. This is preferable because the capability to freely change the width regulated by the width regulation mechanisms makes it possible to use one coating section to produce different matrix resin-impregnated reinforcing fiber sheets having various widths. Here, the relationship between the width (W) of the matrix resin-impregnated reinforcing fiber sheet immediately under the narrowed section and the width (L2) regulated by the width regulation mechanisms at the bottom ends of the width regulation mechanisms is preferably L2≤W+10 (mm), more preferably L2≤W+2 (mm). In addition, it is preferable to make adjustments so that the lower limit of L2 is equal to or greater than W−5 (mm), more preferably equal to or greater than W (mm), from the viewpoint of enhancing the uniformity of the dimension in the width direction of the matrix resin-impregnated reinforcing fiber sheet prepreg 1b. The shape and material of the width regulation mechanism are each not limited to a particular one, and a plate-like bush type is easy and convenient, and accordingly, preferable. In addition, allowing the width regulation mechanism to have a width smaller than the distance between the wall constituent members 21a and 21b in the upper portion, that is, near the liquid surface (as seen in FIG. 10, the width refers to the vertical length of the width regulation mechanism in the "View seen in the Z direction") is preferable because such a width makes it possible not to impede the horizontal flow of the matrix resin. On the other hand, the shape from the middle portion to the lower portion of the width regulation mechanism is preferably in conformity to the internal shape of the coating section because such conformity can make it possible to suppress the retention of the matrix resin in the liquid pool and suppress the degradation of the matrix resin. In this sense, the width regulation mechanism is preferably inserted into the narrowed section 23. FIG. 10 shows an example of a plate-like bush 27 as the width regulation mechanism, and shows an example in which the portion from the middle portion to the lower portion of the bush is in conformity to the tapered shape of the liquid pool 22 and in which the portion is inserted into the narrowed section 23. FIG. 10 shows an example in which L2 is constant from the liquid surface to the outlet, but the width to be regulated may vary depending on the site to the extent that the purpose of the width regulation mechanism is fulfilled. The width regulation mechanism can be fixed in the coating section 20 by an arbitrary method, and fixing the mechanism of a plate-like bush 27 at a plurality of sites in the vertical direction can make it possible to suppress variation of the regulation width due to the deformation of the plate-like bush 27 caused by a high liquid pressure. For example, using a stay for the upper portion and inserting the lower portion into the coating section makes it easy to regulate the width by the width regulation mechanism, and accordingly, is preferable.

Figure 11:
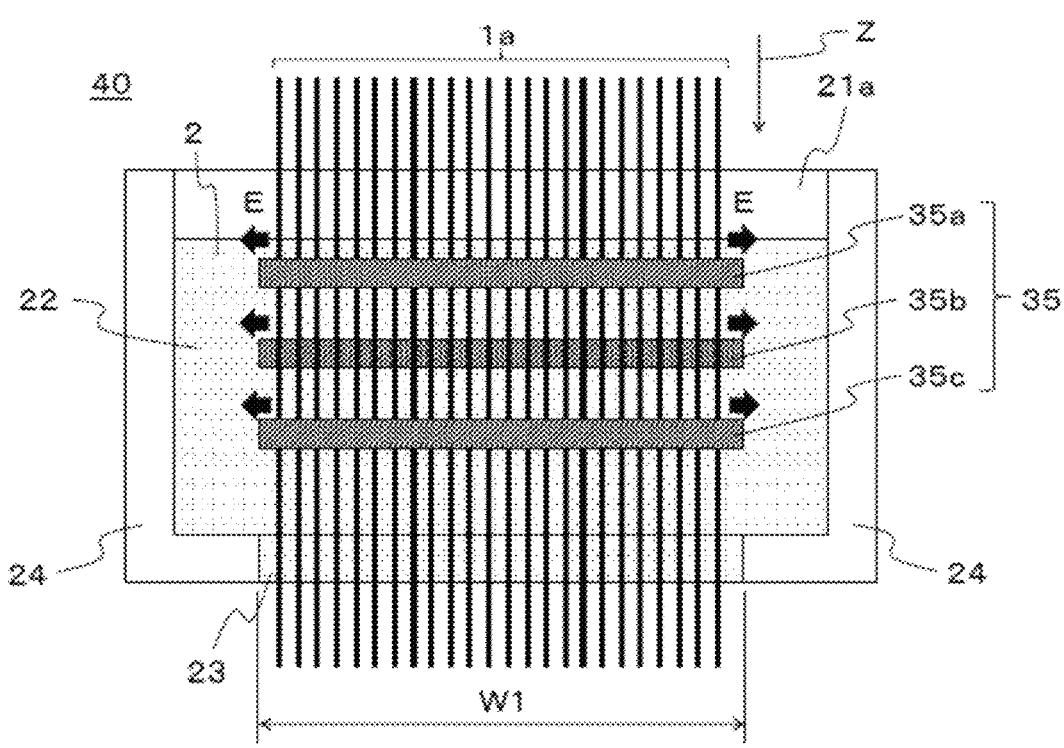
FIG. 11 is a detail cross-sectional view explaining the structure of the inside of the coating section in FIG. 7, as viewed in the direction B in the Figure.

Alternatively, the width regulation mechanism can be provided in the below-mentioned manner in the third production method. FIG. 11 is a detail cross-sectional view of the coating section 40 in FIG. 7, as viewed in the direction B. For explanatory purposes, the wall constituent member 21b is omitted. The group of bars 35 in FIG. 11 are in the form of a column having a uniform cross-section. When a reinforcing fiber sheet 1a is brought in contact with the bars 35 while running in the vertically downward direction Z in the coating section 40 in FIG. 11, not only the inside of the reinforcing fiber sheet 1a is impregnated with a matrix resin 2 drawn into the split between the reinforcing fiber sheet 1a and the bar 35, but also the matrix resin flows and bleeds from both ends of the reinforcing fiber sheet 1a in the direction E in FIG. 11. In cases where a unidirectional material (UD base material) in which reinforcing fibers 1 are unidirectionally arranged is used as a reinforcing fiber sheet 1, the fibers in both ends of the reinforcing fiber sheet 1a are carried away on the flow, and extend in the direction E in FIG. 11, with the result that the width of the reinforcing fiber sheet 1a is changed or that the density of the fibers in both ends of the reinforcing fiber sheet 1a is decreased, making it impossible to obtain a prepreg 1b having uniform quality. Alternatively, in cases where a reinforcing fiber fabric is used as the reinforcing fiber sheet 1a, both ends of the reinforcing fiber fabric is pulled by the flow of the matrix resin 2, and the width may undesirably be changed. In a worst case, both ends of the reinforcing fiber sheet 1a come off from the group of bars 35, posing the possibility that the sheet can run no longer.

Figure 12:
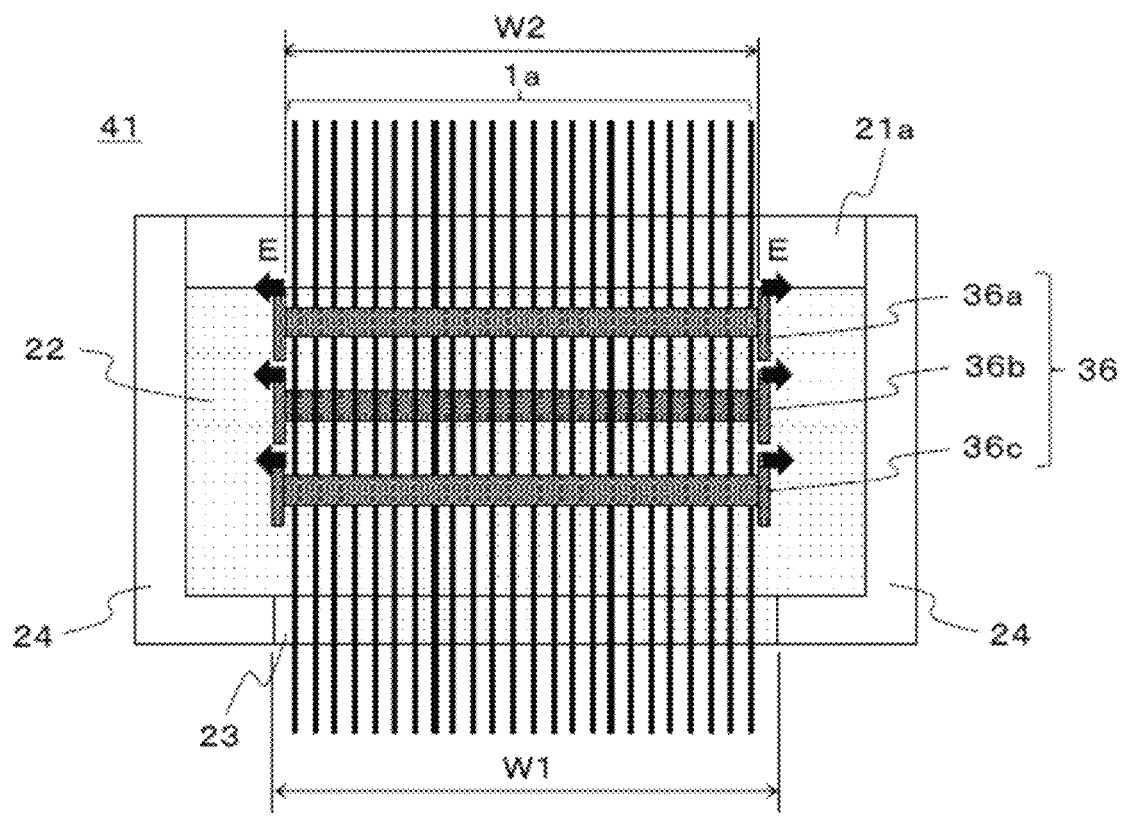
FIG. 12 is a detail cross-sectional view explaining the internal structure of the coating section 41 according to an embodiment other than in FIG. 11.
Figure 13:
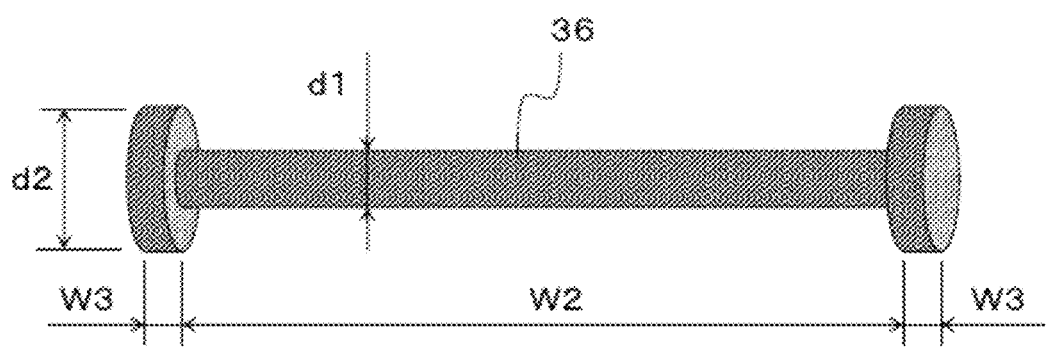
FIG. 13 is a view depicting an example of a bar both ends of which each have a width regulation member.
Figure 14:
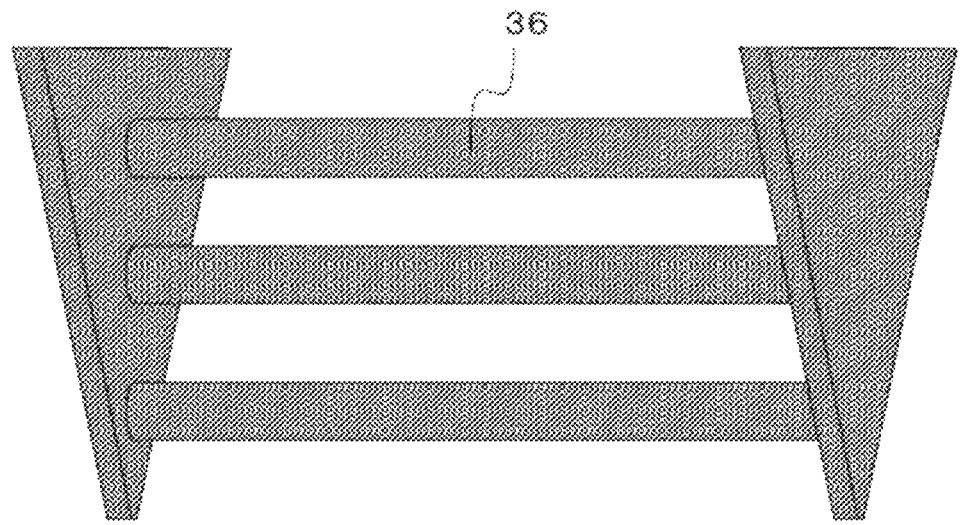
FIG. 14 is a view depicting width regulation members according to an embodiment other than in FIG. 13.
Figure 15:
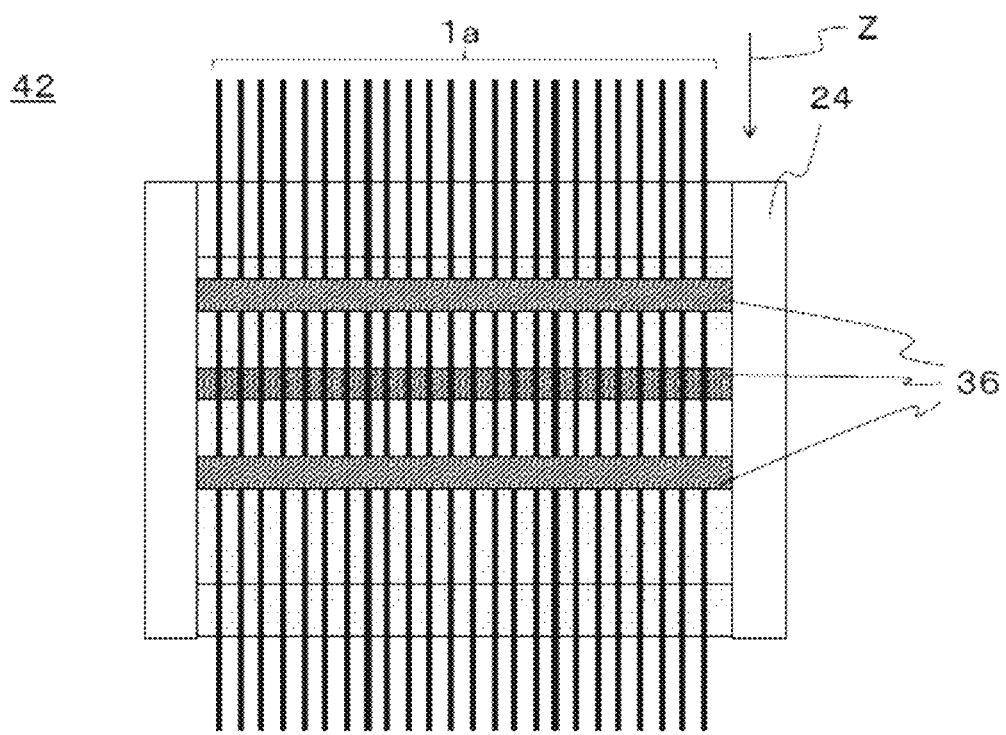
FIG. 15 is a detail cross-sectional view explaining the internal structure of the coating section 42 according to an embodiment other than in FIG. 11.

FIG. 12 is a detail cross-sectional view of the coating section 41 according to an embodiment other than in FIG. 11. The coating section 41 in FIG. 12 includes a group of bars 36 having width regulation members at both ends thereof instead of the group of bars 35 having a uniform cross-section. In the coating section 41 in FIG. 12, a reinforcing fiber sheet 1a is brought in contact with the group of bars 36 while running in the vertically downward direction Z, and the reinforcing fiber sheet 1a is inhibited from extending in the direction E in FIG. 12, making it possible to maintain the density of the fibers of the reinforcing fiber sheet 1a uniformly. In addition, both ends of the reinforcing fiber sheet 1a will not come off from the group of bars 36. The width regulation member may be a disc-like member having a large diameter and attached to each of both ends of each bar, as shown in FIG. 13, or may be each of two parallel plates between which a plurality of bars are sandwiched, as shown in FIG. 14. Alternatively, as shown in FIG. 15, side plate members 24 of a liquid pool may be in contact with the group of bars 36 so that the side plate members 24 can be width regulation members. In cases where the width regulation member shown in FIG. 13 is used, the diameter d2 of the disc-like member at each of both ends of the bar preferably satisfies the relationship, d2≥d1+1 (mm). This is intended to prevent the reinforcing fiber sheet 1a from coming off from both ends of the bar. In addition, the thickness W3 of the disc-like member needs only to be large sufficiently not to deform the disc-like member pushed by the reinforcing fiber sheet 1a. Specifically, W3 is preferably 1 mm or more.

In the coating section 41 in FIG. 12, the spacing W2 within the width regulation members of the group of bars 36 is preferably equal to or shorter than the width W1 of the slit-like outlet. This is because, if the spacing W2 between the width regulation members of the group of bars 36 is wider than the width W1 of the slit-like outlet, the reinforcing fiber sheet 1a having a width widened by the group of bars 36 passes through the slit-like outlet having a narrower width, and thus, both ends of the reinforcing fiber sheet 1a chafes against the slit-like outlet, posing a fear of fuzz generation. Alternatively, if the spacing W2 between the width regulation members of the group of bars 36 is too narrow with respect to the width W1 of the slit-like outlet, the narrow reinforcing fiber sheet 1a which has passed through the group of bars 36 is rapidly widened at the slit-like outlet, and thus, the arrangement of fibers at both ends of the reinforcing fiber sheet 1a are disturbed in some cases. Specifically, if the difference between the spacing W2 between the width regulation members of the group of bars 36 and the width W1 of the slit-like outlet is more than 10 mm, the arrangement of fibers at both ends of the reinforcing fiber sheet 1a are disturbed in some cases. In light of these, it is preferable that the spacing W2 between the width regulation members of the group of bars 36 and the width W1 of the slit-like outlet satisfy the relationship, 0≤W1−W2≤10 (mm). The relationship is more preferably 0≤W1−W2≤5 (mm), still more preferably W1−W2=0 (W1=W2).

<Shape of Liquid Pool>

As described above in detail, it is important in the present invention that allowing the cross-sectional area to decrease continuously in the running direction of the reinforcing fiber sheet in the liquid pool 22 increases the liquid pressure in the running direction of reinforcing fiber sheet, and here, the shape of the cross-sectional area decreasing continuously in the running direction of the reinforcing fiber sheet is not limited to a particular one as long as the shape allows the liquid pressure to increase continuously in the running direction. The shape may be a tapered (linear) one or show a curved form such as a trumpet shape in the cross-sectional view of the liquid pool. In addition, the cross-sectional area decreasing portion may be continuous over the full length of the liquid pool, or the liquid pool may contain a part in which the cross-sectional area does not decrease or contrarily increases, to the extent that the object and effect of the present invention can be achieved. These will be described in detail below with reference to FIGS. 16 to 19.

Figure 16:
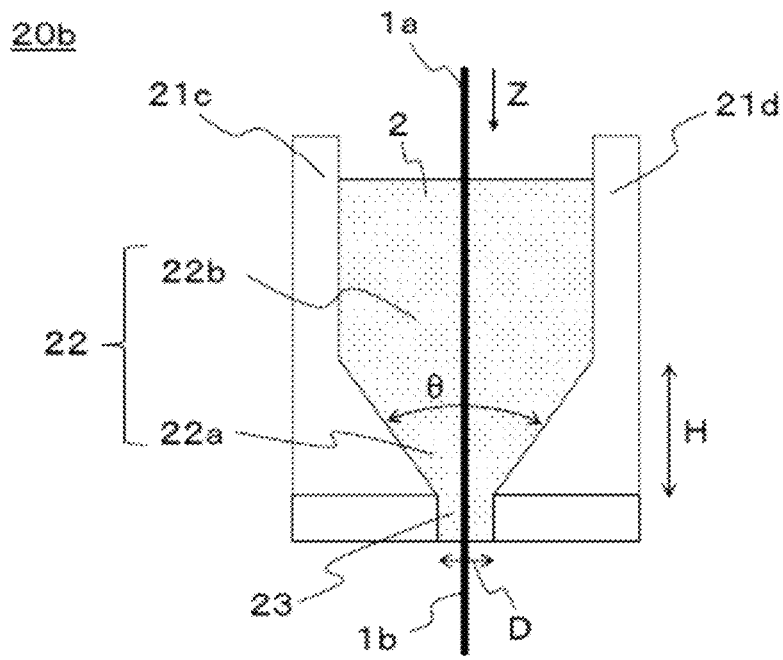
FIG. 16 is a detail cross-sectional view of the coating section 20b according to an embodiment other than in FIG. 4.

FIG. 16 is a detail cross-sectional view of the coating section 20b according to an embodiment other than in FIG. 4. The coating section 20b is the same as the coating section 20 in FIG. 4 except that wall constituent members 21c and 21d constituting the liquid pool 22 are different in shape. As in the coating section 20b in FIG. 16, the liquid pool 22 may be sectioned into the region 22a in which the cross-sectional area decreases continuously in the vertically downward direction Z and the region 22b in which the cross-sectional area does not decrease. In this respect, the vertical height H along which the cross-sectional area decreases continuously is preferably 10 mm or more. The vertical height H along which the cross-sectional area decreases continuously is more preferably 50 mm or more. This assuredly affords a distance along which the matrix resin 2 accompanying the reinforcing fiber sheet 1a is compressed in the region 22a in which the cross-sectional area of the liquid pool 22 decreases continuously, whereby the liquid pressure generated in the lower portion of the liquid pool 22 can be increased sufficiently. This consequently makes it possible to obtain the effect of allowing the liquid pressure to prevent fuzz from clogging the narrowed section 23 and the effect of allowing the liquid pressure to induce the impregnation of the reinforcing fiber sheet 1a with the matrix resin 2.

In cases where, as in the coating section 20 in FIG. 4 and the coating section 20b in FIG. 16, the region 22a in which the cross-sectional area of the liquid pool 22 decreases continuously is tapered, the smaller the opening angle θ of the taper, the more preferable, and specifically, the angle is preferably an acute angle (90° or less). This makes it possible that the effect of compressing the matrix resin 2 in the region 22a (tapered portion) in which the cross-sectional area of the liquid pool 22 decreases continuously is enhanced, and that a high liquid pressure is made easier to obtain.

Figure 17:
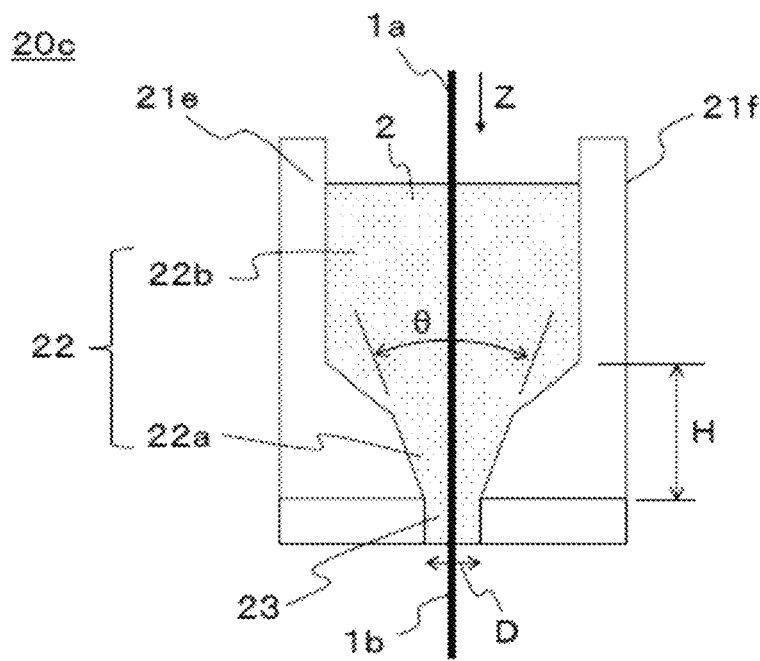
FIG. 17 is a detail cross-sectional view of the coating section 20c according to an embodiment other than in FIG. 16.

FIG. 17 is a detail cross-sectional view of the coating section 20c cording to an embodiment other than in FIG. 16. The coating section 20c is the same as the coating section 20b in FIG. 16 except that wall constituent members 21e and 21f constituting the liquid pool 22 form a two-tier taper. In this manner, the region 22a in which the cross-sectional area of the liquid pool 22 decreases continuously may be constituted by a multi-tapered portion composed of two or more tiers. In this respect, the opening angle θ of the tapered portion nearest the narrowed section 23 is preferably an acute angle, from the viewpoint of enhancing the above-mentioned compression effect. Also in this case, the height H of the region 22a along which the cross-sectional area of the liquid pool 22 decreases continuously is preferably 10 mm or more. The vertical height H along which the cross-sectional area decreases continuously is more preferably 50 mm or more. Having a multi-tier tapered portion as the region 22a in which the cross-sectional area of the liquid pool 22 decreases continuously, as in FIG. 17, makes it possible to maintain the volume of the matrix resin 2 that can be stored in the liquid pool 22, and at the same time, to decrease the angle θ of the tapered portion nearest the narrowed section 23. This increases the liquid pressure caused in the lower portion of the liquid pool 22, and can further enhance the fuzz elimination effect and the impregnation effect of the matrix resin 2.

Figure 18:
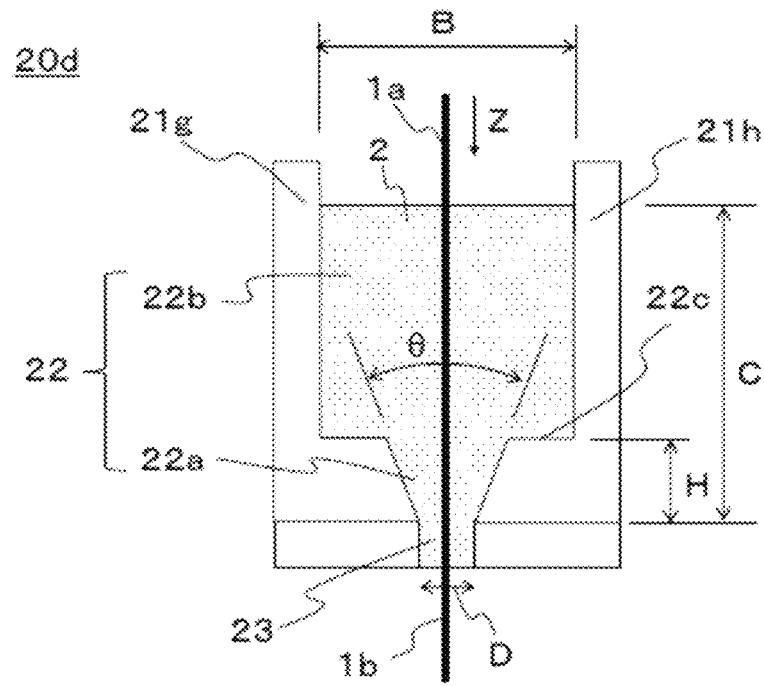
FIG. 18 is a detail cross-sectional view of the coating section 20d according to an embodiment other than in FIG. 16.

FIG. 18 is a detail cross-sectional view of the coating section 20d according to an embodiment other than in FIG. 16. The coating section 20d is the same as the coating section 20b in FIG. 16 except that wall constituent members 21g and 21h constituting the liquid pool 22 form a tier. In this manner, allowing the lowermost portion of the liquid pool 22 to have the region 22a in which the cross-sectional area decreases continuously makes it possible to obtain the effect of increasing the liquid pressure, wherein the effect is an object of the present invention, and accordingly, the other part of the liquid pool 22 may include a region 22c in which the cross-sectional area decreases intermittently. Allowing the liquid pool 22 to have such a shape as in FIG. 21 makes it possible that the shape of the region 22a in which the cross-sectional area decreases continuously is maintained, and at the same time, that the depth B of the liquid pool 22 is enlarged to increase the volume of the matrix resin 2 that can be stored. As a result, even in cases where the matrix resin 2 cannot be supplied into the coating section 20d continuously, the matrix resin 2 can continue to be provided to the reinforcing fiber sheet 1a for a long time, whereby the productivity of the reinforcing fiber sheet prepreg 1b can be enhanced.

Figure 19:
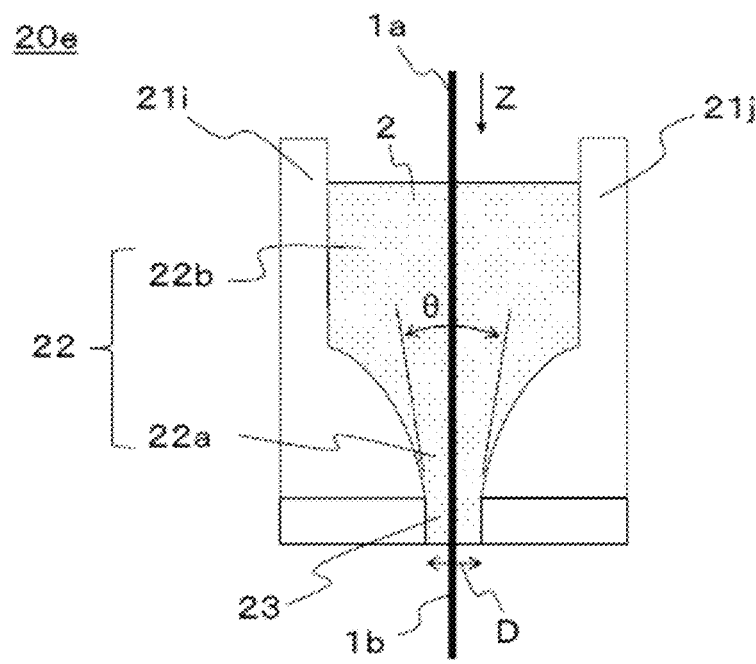
FIG. 19 is a detail cross-sectional view of the coating section 20e according to an embodiment other than in FIG. 16.

FIG. 19 is a detail cross-sectional view of the coating section 20e according to an embodiment other than in FIG. 16. The coating section 20e is the same as the coating section 20b in FIG. 16 except that wall constituent members 21i and 21j constituting the liquid pool 22 form a trumpet shape (curved shape). In the coating section 20b in FIG. 16, the region 22a in which the cross-sectional area of the liquid pool 22 decreases continuously is tapered (linear), but, without limitation to this, may be, for example, in trumpet shape (curved shape) as in FIG. 19. However, the lower portion of the liquid pool 22 and the upper portion of the narrowed section 23 are preferably connected smoothly. This is because any step at the boundary between the lower portion of the liquid pool 22 and the upper portion of the narrowed section 23 causes the reinforcing fiber sheet 1a to be caught by the step, where fuzz will undesirably be generated. In cases where, in this manner, the region in which the cross-sectional area of the liquid pool 22 decreases continuously is in trumpet shape, the opening angle θ between the virtual tangent lines of the lowermost region 22a in which the cross-sectional area of the liquid pool 22 decreases continuously is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

Figure 20:
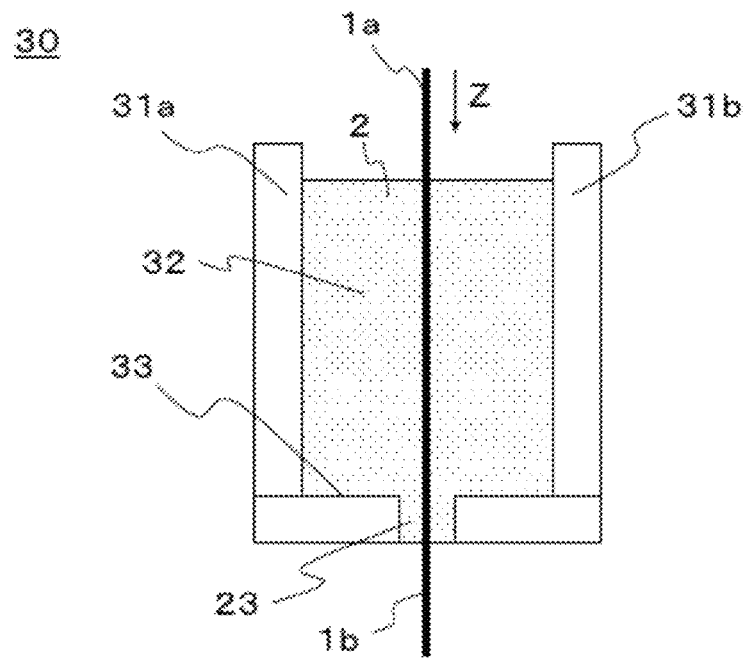
FIG. 20 is a detail cross-sectional view of the coating section 30 according to an embodiment other than of the present invention.

FIG. 20 is a detail cross-sectional view of the coating section 30 according to an embodiment other than of the present invention. Differently from an embodiment of the present invention, the liquid pool 32 in FIG. 20 does not contain a region in which the cross-sectional area decreases continuously in the vertical downward direction Z, but the liquid pool 32 is configured such that the cross-sectional area decreases discontinuously and suddenly at the boundary 33 with the narrowed section 23. This makes it more likely that the reinforcing fiber sheet 1a causes clogging at the narrowed section.

<Running Mechanism>

Known rollers or the like can suitably be used as a running mechanism for conveying a reinforcing fiber sheet and the prepreg according to the present invention. In the present invention, the reinforcing fiber sheet is conveyed vertically downward, and accordingly, the rollers are preferably disposed above and below the coating section, which is between the rollers.

In addition, it is preferable in the present invention that the running pathway of the reinforcing fiber sheet is as linear as possible in order to suppress arrangement disturbance and fuzzing of the reinforcing fibers. Additionally, in a step of conveying a sheet-like integrated object that is a laminate of a prepreg and a release sheet, it is preferable that the running pathway of the sheet-like integrated object is also as linear as possible, because a bend, if any, in the conveying step generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<Additional-Impregnation>

In the present invention, impregnation progresses in the coating section, and after this, an additional-impregnation process can be carried out to further advance impregnation.

In the present invention, particularly in cases where the matrix resin 2 heated to a temperature higher than room temperature is applied to the reinforcing fiber sheet 1a, the temperature of the matrix resin-impregnated reinforcing fiber sheet 1b immediately under the coating section 20 is higher than room temperature. Because of this, the prepreg which has gone out of the coating section and then immediately undergone an additional-impregnation process is not cooled to room temperature, and thus, it is made possible to omit or simplify a heating device, such as a hot plate, for reheating the matrix resin-impregnated reinforcing fiber sheet 1b. In the present invention, an additional-impregnation device 19 is included immediately under the coating section, and carrying out the additional-impregnation process makes it possible to obtain a prepreg 1c adjusted to a desired degree of impregnation. Because of this, the distance N from the outlet of the coating section to the starting point of additional-impregnation is 1 m or less. N is preferably 0.5 m or less.

In the first production method, a noncontact heating device is disposed as an additional-impregnation device, enabling the additional-impregnation process to be carried out by noncontact heating, as shown in FIG. 1. In this case, the temperature of the matrix resin contained in the matrix resin-impregnated reinforcing fiber sheet 1b can be increased to lower the viscosity of the resin so that impregnation can be advanced through capillarity phenomena. For this purpose, it is important that Formula 1 is satisfied assuming that the surface temperature of the matrix resin-impregnated reinforcing fiber sheet is P2 (° C.) at the time of completion of the heating and that the temperature of the matrix resin stored in the inside of the coating section is M (° C.), $$M \leq P2 \tag{Formula 1}.$$

P2 (° C.) is preferably M+30 (° C.) or more, in which case the impregnation is advanced more easily, and this is preferable. In this case, the distance from the outlet of the coating section to the additional-impregnation starting point is the distance N2 from the outlet of the coating section to the heating starting point of the heating device of a noncontact type (see FIG. 26).

Examples of noncontact heating means that can be used include infrared rays, far-infrared rays, laser, heat media (for example, steam and the like), and the like. Infrared rays are most convenient, and thus, are preferable. The heating distance is not limited to any particular value provided that the matrix resin-impregnated reinforcing fiber sheet can be heated to a desired temperature. The heating distance is preferably 1 m or less in a sense that such a distance makes it possible to simplify the device. The heating distance is preferably 0.5 m or less.

In addition, use of a noncontact heating device leads to carrying out no pressing on the matrix resin-impregnated reinforcing fiber sheet, and thus, causes, for example, the surface tension of the matrix resin to disturb the reinforcing fiber layer in some cases. Because of this, the additional-impregnation process is carried out by noncontact heating, preferably followed by pressing so that the shape of the prepreg and the shape and arrangement of the reinforcing fiber layer can be made suitable. Examples of pressing means that can be used include nip rolls, S-shaped arranged rolls, and the like.

Figure 2B:
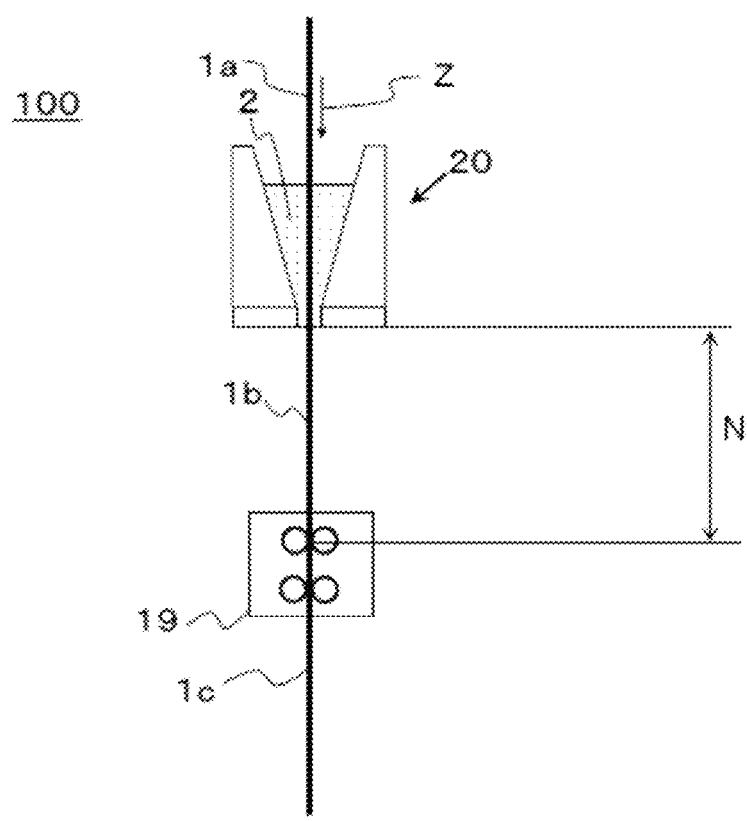
FIG. 2b is an enlarged detail cross-sectional view of the portions of the coating section and the additional-impregnation device 19 in FIG. 1.
Figure 2C:
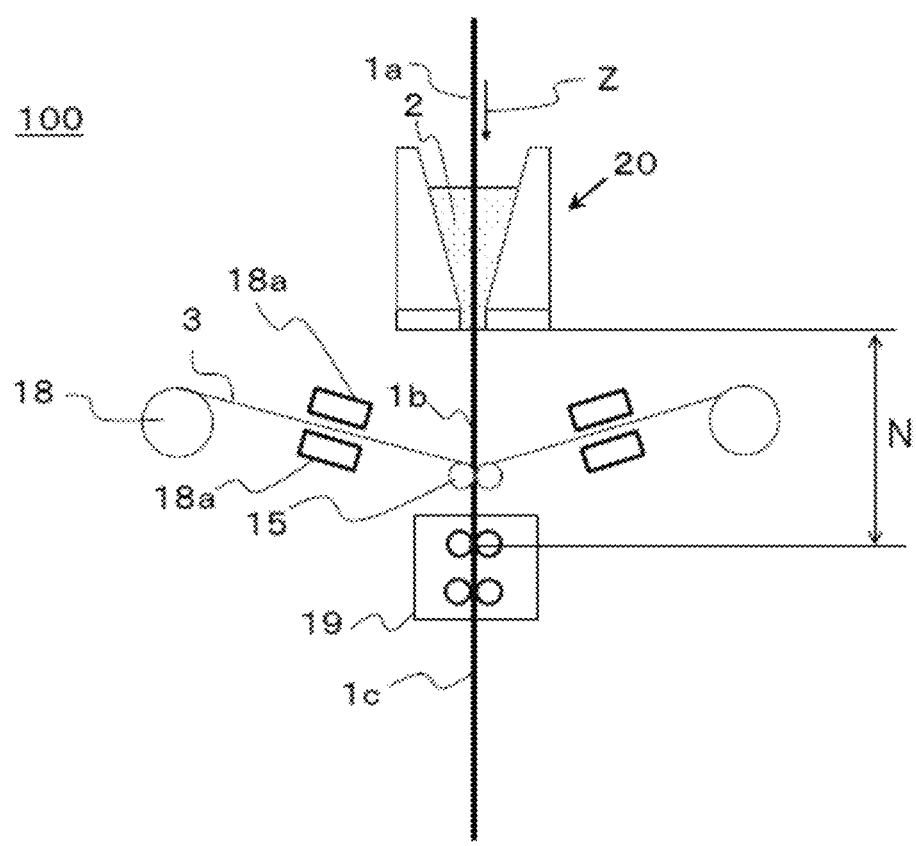
FIG. 2c is a detail cross-sectional view of a method according to an embodiment other than in FIG. 2a, in which method a release sheet 3 is used.

Next, in the second production method, an additional-impregnation device including a pressing means can be used, as shown in FIG. 2b and FIG. 2c. In the second production method, the distance N from the outlet of the coating section to the starting point of the pressing in the additional-impregnation process is 1 m or less, and allowing the surface temperature P (° C.) of the matrix resin-impregnated reinforcing fiber sheet before the additional-impregnation process to satisfy the relationship of Formula 2 with the temperature M(° C.) of the matrix resin stored in the coating section makes it possible to make the device compact or simplify the heating device and, at the same time, to obtain a desired degree of impregnation.

$$M-30 \leq P \tag{Formula 2}$$

The temperature M (° C.) of the matrix resin stored in the coating section 20 can be measured using a thermocouple. The surface temperature P (° C.) of the matrix resin-impregnated reinforcing fiber sheet before the additional-impregnation process can be measured using a radiation thermometer. In this regard, the emissivity varies depending on the measuring object, but an emissivity of 0.95 is uniformly used for measurement. The surface temperature P (° C.) of the matrix resin-impregnated reinforcing fiber sheet 1*b* is measured at a measuring position located at a distance of 10 cm which starts toward the coating section 20 from the starting point of the pressing in the additional-impregnation process. In some of the cases where the distance N from the outlet of the coating section to the starting point of the pressing in the additional-impregnation process is less than 10 cm, such a measurement is difficult in terms of manipulation, and a measurement is made of the surface temperature P (° C.) of the matrix resin-impregnated reinforcing fiber sheet 1*b* located as near the starting point of the pressing as possible. In this regard, the measuring point is the center of the matrix resin-impregnated reinforcing fiber sheet 1*b* in the width direction. One example of a thermometer usable for measurement is an infrared radiation thermometer AD-5611A (with the emissivity set to and fixed at 0.95; manufactured by A&D Company, Limited).

In the first production method and the second production method, additionally impregnating the matrix resin-impregnated reinforcing fiber sheet 1*b* immediately under the coating section 20 is referred to as an additional-impregnation process so to be distinguished from the impregnation process in the coating section, and a sheet obtained by the additional-impregnation process is referred to as a prepreg 1*c*.

In addition, as shown in FIG. 2*c*, applying the release sheet 3 makes it possible to prevent the matrix resin from contaminating the rolls and the device which are brought in contact with the matrix resin-impregnated reinforcing fiber sheet 1*b* and the prepreg 1*c* in the production process in the present invention and to enhance the running properties of the matrix resin-impregnated reinforcing fiber sheet 1*b* and the prepreg 1*c*, and thus, the release sheet 3 can be applied to the matrix resin-impregnated reinforcing fiber sheet 1*b* before the sheet undergoes the additional-impregnation process. In cases where the matrix resin 2 heated to a temperature higher than room temperature is applied to the reinforcing fiber sheet 1*a*, the release sheet 3 to be applied in the present invention may be heated before the release sheet 3 is applied to the matrix resin-impregnated reinforcing fiber sheet 1*b*. Heating the release sheet 3 before applying the sheet can prevent the surface temperature of the matrix resin-impregnated reinforcing fiber sheet 1*b* brought in contact with the release sheet from significantly decreasing, enables the degree of impregnation to be inhibited from decreasing, and thus, is preferable. Heating this release sheet 3 thus before applying the sheet makes it possible to omit or simplify the heating device in the additional-impregnation device. In cases where the surface temperature T (° C.) of the release sheet before being applied to the matrix resin-impregnated reinforcing fiber sheet is too lower than the surface temperature K (° C.) of the matrix resin-impregnated reinforcing fiber sheet 1*b* before having the release sheet applied thereto, the effect of omitting or simplifying the device is low. Conversely, in cases where the surface temperature T (° C.) of the release sheet before being brought in contact with the matrix resin-impregnated reinforcing fiber sheet is too high, the matrix resin protrudes from the matrix resin-impregnated reinforcing fiber sheet 1*b* during the additional-impregnation process, making it difficult to continue the additional-impregnation process. Because of this, setting T and K in a range that satisfies the below-mentioned Formula 3 makes it possible to obtain a high degree of impregnation and further to inhibit the matrix resin from protruding, and thus, is preferable.

$$K-10 \leq T \leq K+50 \quad \text{(Formula 3)}.$$

The heating device for heating the release sheet 3 is not limited to any particular device, and examples of various heating means that can be used include air heating, infrared heating, far-infrared heating, laser heating, contact heating, heat medium heating (steam), and the like.

In this regard, the surface temperature P (° C.) of the matrix resin-impregnated reinforcing fiber sheet 1*b* before the additional-impregnation process, the surface temperature T (° C.) of the release sheet before being applied to the matrix resin-impregnated reinforcing fiber sheet, and the surface temperature K (° C.) of the matrix resin-impregnated reinforcing fiber sheet before having the release sheet applied thereto can be measured using a radiation thermometer. The emissivity varies depending on the measuring object, but an emissivity of 0.95 is uniformly used for measurement. In one example, a measurement can be made using an infrared radiation thermometer AD-5611A (with the emissivity set to and fixed at 0.95; manufactured by A&D Company, Limited). The surface temperature P (° C.) of the matrix resin-impregnated reinforcing fiber sheet 1*b* before undergoing the additional-impregnation process and after having the release sheet 3 applied thereto cannot be directly measured, and thus, the surface temperature of the applied release sheet is measured as P (° C.). In carrying out the measurement, the measuring position of P is located at a distance of 10 cm which starts toward the coating section 20 from the starting point of the pressing in the additional-impregnation process. In some of the cases where the distance N from the outlet of the coating section to the starting point of the pressing in the additional-impregnation process is less than 10 cm or in some of the cases where the distance from the starting point of the pressing in the additional-impregnation process to the position at which the matrix resin-impregnated reinforcing fiber sheet is brought in contact with the release sheet is less than 10 cm, the measurement is difficult in terms of manipulation, but the measurement should be made at a position as near the starting point of the pressing as possible. Regarding the measurement position of the surface temperature T (° C.) of the release sheet 3, the measurement is made at a distance of 10 cm which starts toward the release sheet supply device 18 from a position at which the release sheet 3 is brought in contact with the matrix resin-impregnated reinforcing fiber sheet 1*b*. In this regard, the measuring point is the center of the release sheet 3 in the width direction. The surface temperature K (° C.) of the matrix resin-impregnated reinforcing fiber sheet 1*b* before having the release sheet applied thereto is measured at a measuring position located at a distance of 10 cm which starts toward the coating section 20 from a position at which the sheet 1*b* is brought in contact with the release sheet 3. In cases where the distance from the outlet of the coating section to the position at which the matrix resin-impregnated reinforcing fiber sheet 1*b* is brought in contact with the release sheet 3 is less than 10 cm, the measurement should be made at a position as near as possible to the position at which the matrix resin-impregnated reinforcing fiber sheet is brought in contact with the release sheet. In this regard, the measuring point is the center of the matrix resin-impregnated reinforcing fiber sheet 1*b* in the width direction. In this regard, the surface temperature P2 (° C.) of the matrix resin-impregnated reinforcing fiber sheet at the completion point of heating in the first production method can also be measured using a radiation thermometer in the same manner. The surface temperature of the prepreg is measured at a measuring position 10 cm downstream from a noncontact heating device.

In the second production method, the pressing method in the additional-impregnation device 19 is not limited to any particular method. Preferable examples thereof include: a nip roll method which makes it possible to decrease the roll diameter, set pressure, and contact length along which the prepreg is in contact with the roll and makes it possible to make the device smaller; and an S-shaped arranged roll method which enables a wide pressing area to be secured, thus making it possible to obtain a take-up capability as well as achieve impregnation. In cases where the pressing method is a nip roll method, an impregnation load obtained by dividing a force applied to a nip roll by a prepreg width is preferably 0.1 N/mm to 40 N/mm or less. In cases where the load is too low, the degree of impregnation is low. In some of the cases where the load is too high, the matrix resin protrudes in the width direction, or the width of the prepreg is excessively widened, making it impossible to obtain a prepreg having a target areal weight.

In addition, in cases where the matrix resin 2 heated to a temperature higher than room temperature is applied to the reinforcing fiber sheet 1a and, at the same time, where a roll is used for pressing in the additional-impregnation process, the roll preferably has a heating mechanism. This makes it possible to inhibit the surface temperature of a matrix resin-impregnated reinforcing fiber sheet 1b from decreasing and to obtain a high impregnating property. In addition, the additional-impregnation device may have a heating device to be used before pressing. Heating the matrix resin-impregnated reinforcing fiber sheet 1b before pressing it increases the temperature of the matrix resin, and decreases the viscosity of the matrix resin in the matrix resin-impregnated reinforcing fiber sheet 1b, thus achieving a high impregnating property, but it is necessary to pay attention to the possibility that the device will be a large scale one. To enhance the impregnating property, the viscosity of the matrix resin in the matrix resin-impregnated reinforcing fiber sheet 1b needs only to be low before the pressing in the additional-impregnation process. For this purpose, the viscosity of the matrix resin in the matrix resin-impregnated reinforcing fiber sheet 1b before the pressing is preferably 80 Pa·s or less, as measured at a strain rate of 3.14 $s^{-1}$. In this regard, it is difficult to directly measure the viscosity of the matrix resin in the matrix resin-impregnated reinforcing fiber sheet 1b before the pressing, and thus, the viscosity of the matrix resin is preferably 80 Pa·s or less as measured at a strain rate of $3.14^1$ at the above-mentioned surface temperature P (° C.) of the matrix resin-impregnated reinforcing fiber sheet before entering into the additional-impregnation process.

Any one of the below-mentioned devices can be suitably selected as another additional-impregnation device. For example, as described in JP2011-132389A and WO2015/060299, impregnation can be promoted by preheating a laminate of a sheet-like carbon fiber bundle and a resin on a hot plate and sufficiently softening the resin on the sheet-like carbon fiber bundle, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO2010/150022, wherein a prepreg sheet runs in S-shape through the S-wrap rolls. In the present invention, "S-wrap rolls" are simply referred to as "S-shaped arranged rolls". FIG. 1 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO2015/076981, it is also possible to attempt to increase the production speed of prepreg by arranging a conveyor belt opposite to "S-wrap rolls" and thereby enhancing impregnation efficiency. Alternatively, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold a prepreg up and carry out impregnation.

<Degree of Impregnation>

The state of impregnation with a matrix resin in a prepreg obtained by a production method according to the present invention can be checked by cleaving a sampled prepreg and visually observing whether the inside of the prepreg is impregnated. More quantitatively, the impregnation can be evaluated, for example, by a peeling method. Measuring the impregnation ratio of the matrix resin by a peeling method can be carried out in the following manner. That is, a sampled prepreg is sandwiched between adhesive tapes, these are peeled off, and the reinforcing fiber to which the matrix resin has stuck and the reinforcing fiber to which the matrix resin has not stuck are separated. Then, the ratio of the mass of the reinforcing fiber to which the matrix resin has adhered with respect to the mass of the whole reinforcing fiber sheet that has been used can be regarded as an impregnation ratio of the matrix resin based on a peeling method. From the viewpoint of handling a prepreg, it is preferable that the degree of impregnation is 80% or more based on a peeling method.

<High Tension Take-Up Device>

In the present invention, it is preferable that a high tension take-up device for withdrawing the prepreg from the coating section is disposed downstream of the coating section in the process. This is because high friction force and shearing stress are generated between the reinforcing fiber sheet and the matrix resin in the coating section, and accordingly, it is preferable that high take-up tension is generated downstream in the process, in order to overcome the high friction force and the shearing stress and withdraw the prepreg. As a high tension take-up device, nip rolls, S-shaped arranged rolls, and the like can be used, and in any case thereof, enhancing friction force between the rolls and the prepreg can prevent slip and achieve stable running. To achieve this, it is preferable to arrange a high friction coefficient material on the surface of the roll, increase the nip pressure, or increase the pressing pressure of the prepreg against the S-shaped arranged rolls. The S-shaped arranged rolls make it possible to more easily control friction force on the basis of the roll diameter and the contact length, and accordingly, are more preferable, from the viewpoint of preventing slip.

<Release Sheet Supply Device and Winder>

A release sheet supply device and a winder can suitably be used in producing prepreg or FRP using the present invention. As such a device, any known one can be used, and in any case, it is preferable from the viewpoint of running the sheet stably that such a device includes a mechanism for making it possible to feed an unwinding or wind-up tension back to the unwinding or wind-up speed.

<Prepreg Width>

A prepreg that is a kind of precursor of FRP is one form of the reinforcing fiber sheet obtained in the present invention, and accordingly, a case where the present invention is applied to FRP applications will be described below, wherein the reinforcing fiber sheet is referred to as a prepreg.

The width of a prepreg is not limited to a particular one, and the width may be broad, tens of centimeters to approximately two meters, or may be tape-like, several millimeters to tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

A method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production apparatuses enables prepregs to be produced in a plurality of lines using the same running devices, conveyance devices, various rolls, and winders.

In addition, prepreg tapes can be obtained by forming a reinforcing fiber sheet from approximately one yarn to three yarns of tape-like reinforcing fiber bundles and allowing the resulting reinforcing fiber sheet to pass through the coating section the width of which is adjusted to afford a desired tape width. For prepreg tapes, particularly the accuracy of the tape width is often required, from the viewpoint of controlling cross-directional overlapping between the tapes. Because of this, it is preferable to control the coating section outlet width more strictly, and in this case, it is preferable that the above-mentioned L, L2, and W satisfy the relationship(s) of L≤W+1 mm and/or L2≤W+1 mm.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs and then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the matrix resin component (the resin component in the case of CFRP) sticking to the slit cutter blade can be decreased, resulting in being also advantageous in that the cleaning cycle for the slit cutter blade can be extended.

<Matrix Resin Supply Mechanism>

In the present invention, the matrix resin is stored in the coating section, but it is preferable to replenish the matrix resin suitably because the coating progresses. The mechanism for supplying the coating section with a matrix resin is not limited to a particular one, and a known device can be used. Supplying the coating section with a matrix resin continuously makes it possible not to disturb the liquid surface at the top of the coating section and to stabilize the running of the reinforcing fiber sheet, and accordingly, is preferable. For example, the matrix resin can be supplied by its own weight as a driving force from a vessel storing the matrix resin, or supplied continuously using a pump or the like. As a pump, a gear-pump, tube pump, pressure pump, and the like can suitably be used in accordance with the properties of the matrix resin. In addition, in cases where the matrix resin is solid at room temperature, a melter is preferably provided at the upper portion of the storage vessel. In addition, a continuous extruder and the like can be used. As to the supply amount of the matrix resin, a mechanism for enabling the matrix resin to be supplied continuously in accordance with the coating amount is preferably provided so that the liquid level of the matrix resin in the upper portion in the coating section can be as constant as possible. For this, for example, a mechanism in which the liquid level and the coating section weight are monitored and fed back to a supply device is conceivable.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a reinforcing fiber sheet and the thickness of a prepreg and analyzing the difference between the thicknesses. The coating amount monitored on-line can immediately be fed back to the coating section, and utilized to adjust the temperature of the coating section and the gap D in the narrowed section 23 (see FIG. 2). Needless to say, the coating amount monitoring can be used as defect monitoring. As to the thickness measurement position, for example, in FIG. 12, the thickness of the reinforcing fiber sheet 416 can be measured in the vicinity of the diverting roll 419, and the thickness of the prepreg can be measured in the vicinity of the high tension take-up device 444. In addition, on-line defect monitoring is preferably carried out using infrared, near-infrared, camera (image analysis), and the like.

A prepreg production apparatus according to the present invention includes: a running mechanism for allowing a reinforcing fiber sheet to run substantially vertically downward; a coating mechanism for applying a matrix resin to the reinforcing fiber sheet to obtain a matrix resin-impregnated reinforcing fiber sheet; an additional-impregnation mechanism for at least pressing the matrix resin-impregnated reinforcing fiber sheet; a release sheet supply mechanism for supplying a release sheet to apply the release sheet to at least one face of the matrix resin impregnated sheet before carrying out an additional-impregnation process on the matrix resin impregnated sheet; and a heating mechanism for heating the release sheet; wherein the coating mechanism can store a coating liquid therein and further comprises a liquid pool and a narrowed section which are in communication with each other, wherein the liquid pool has a portion whose cross-sectional area decreases continuously along a running direction of a sheet-like reinforcing fiber bundle, and wherein the narrowed section has a slit-like cross-section and has a cross-sectional area smaller than the top side of the liquid pool; wherein the additional-impregnation mechanism is arranged such that the starting point of the pressing in the additional-impregnation process is 1 m or less from the coating mechanism; and wherein the prepreg production apparatus has a release sheet heating mechanism between the release sheet supply mechanism and the impregnation mechanism.

Below, the present invention will be described in detail with reference to a specific example in which a prepreg is produced using a coating device in the prepreg production apparatus. In this regard, the following description is an example, and the present invention is not construed to be limited to the aspect described below.

Figure 21:
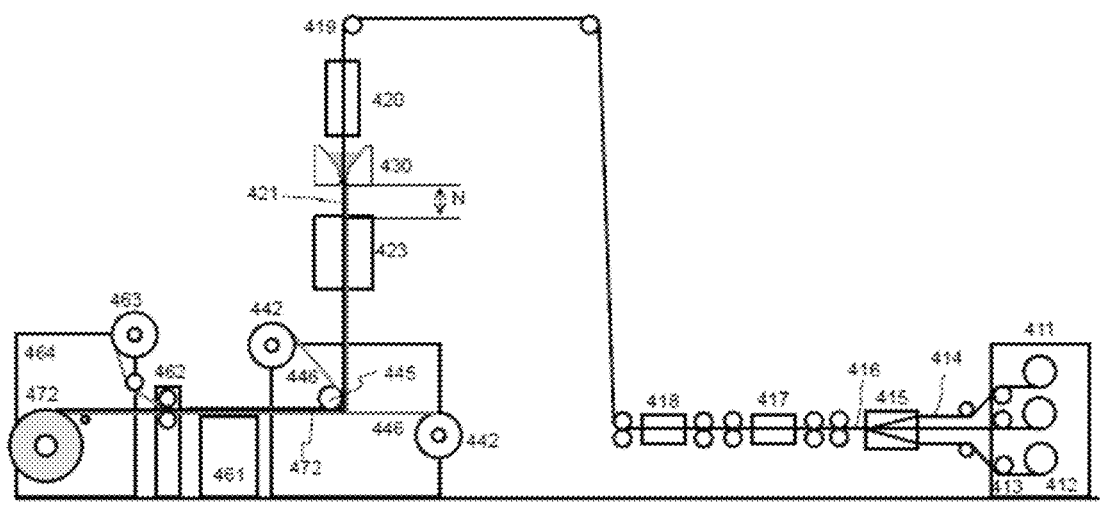
FIG. 21 is a schematic diagram depicting an example of an embodiment of a prepreg production process using the first production method according to the present invention.
Figure 22:
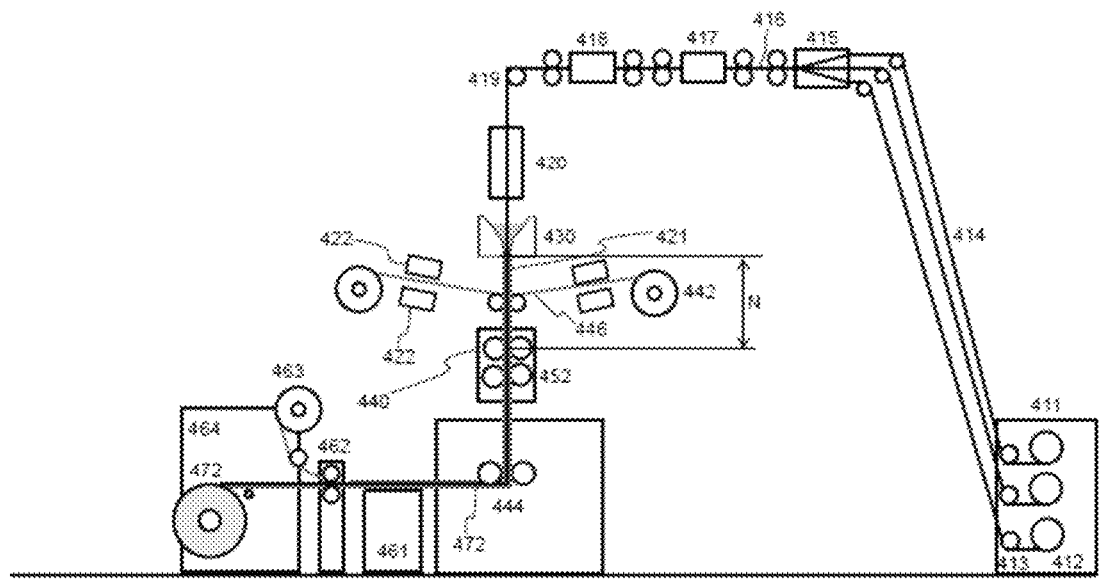
FIG. 22 is a schematic diagram of an example of another prepreg production process using the second production method according to the present invention.

FIG. 21 is a schematic diagram showing an example of a production process/device in the first production method according to the present invention. A plurality of reinforcing fiber bobbins 412 are fit onto creels 411. Then, a braking mechanism provided in the creel enables the reinforcing fiber bundle 414 to be withdrawn at a constant tension. A plurality of the reinforcing fiber bundles 414 that have been withdrawn are orderly arranged by a reinforcing fiber arrangement device 415 to form a reinforcing fiber sheet 416. Here, FIG. 21 depicts only three yarns of reinforcing fiber bundles, but in reality, one yarn to hundreds of yarns are possible, and adjustments can be made to afford a desired prepreg width and fiber areal weight. Then, the reinforcing fiber sheet passes through a fiber bundle widening device 417 and a smoothing device 418, passes by a diverting roll 419, and is conveyed. In FIG. 21, the reinforcing fiber sheet 416 is linearly conveyed between the devices from the reinforcing fiber arrangement device 415 to the diverting roll 419. In this regard, the fiber bundle widening device 417 and the smoothing device 418 can be skipped suitably, or omitted depending on the purpose. In addition, the arrangement order of the reinforcing fiber arrangement device 415, the fiber bundle widening device 417, and smoothing device 418 can suitably be changed in accordance with the purpose. The reinforcing fiber sheet 416 runs vertically downward from the diverting roll 419, and passes through the reinforcing fiber preheating device 420 and the coating section 430 to obtain a matrix resin-impregnated reinforcing fiber sheet 421. Then, the matrix resin-impregnated reinforcing fiber sheet 421 is allowed to pass through a noncontact heating device 423 disposed at a distance of N immediately under the coating section 430, so that the impregnation is advanced. Furthermore, a release sheet is applied to the sheet on a diverting roll 445, and the sheet-like integrated object is cooled on a cooling device 461, is taken up by a take-up device 462, followed by peeling off the release sheet 446, and then, is wound up in a winder 464, whereby a sheet-like integrated object 472 composed of prepreg and a release sheet can be obtained as a product. Here, the depiction of a matrix resin supply device and an on-line monitoring device is omitted in FIG. 21. FIG. 22 is a schematic diagram showing an example of a production process/device in the second production method according to the present invention. A plurality of reinforcing fiber bobbins 412 are fit onto creels 411, and the reinforcing fibers pass by the diverting guides 413 and withdrawn upward. Here, a braking mechanism provided in the creel enables the reinforcing fiber bundle 414 to be withdrawn at a constant tension. A plurality of the reinforcing fiber bundles 414 that have been withdrawn are orderly arranged by a reinforcing fiber arrangement device 415 to form a reinforcing fiber sheet 416. Here, FIG. 22 depicts only three yarns of reinforcing fiber bundles, but in reality, one yarn to hundreds of yarns are possible, and adjustments can be made to afford a desired prepreg width and fiber areal weight. Then, the reinforcing fiber sheet passes through a fiber bundle widening device 417 and a smoothing device 418, passes by a diverting roll 419, and is conveyed vertically downward. In FIG. 22, the reinforcing fiber sheet 416 is linearly conveyed between the devices from the reinforcing fiber arrangement device 415 to the diverting roll 419. In this regard, the fiber bundle widening device 417 and the smoothing device 418 can be skipped suitably, or omitted depending on the purpose. In addition, the arrangement order of the reinforcing fiber arrangement device 415, the fiber bundle widening device 417, and smoothing device 418 can suitably be changed in accordance with the purpose. The reinforcing fiber sheet 416 runs vertically downward from the diverting roll 419, passes through the reinforcing fiber preheating device 420 and the coating section 430 to obtain a matrix resin-impregnated reinforcing fiber sheet 421. Release sheets 446 unwound from release sheet supply devices 442 are applied to both faces of the matrix resin-impregnated reinforcing fiber sheet 421, which passes through an additional-impregnation device 440, and reaches a high tension take-up device 444. In FIG. 22, the release sheets 446 are applied to both the faces, but such a release sheet is optionally not applied, or applied to only one face. In this regard, the release sheet 446 may be heated by a release sheet heating device 422. For the coating section 430, an arbitrary coating section shape can be adopted to the extent that the object of the present invention can be achieved. Examples include such shapes as in FIGS. 4 and 16 to 19. In addition, bushes 27 can be provided as in FIG. 10, if necessary. In addition, bars can be provided in the coating section as in FIG. 7. For the additional-impregnation device, any device configuration can be adopted to the extent that the object of the present invention can be achieved. In FIG. 22, an additional-impregnation device including heated nip rolls 452 is depicted as an additional-impregnation device 440. Allowing the sheet to pass through the additional-impregnation device makes it possible to obtain a prepreg/release sheet (sheet-like integrated object) 472 having a high degree of impregnation. In FIG. 12, heated nip rolls 452 are depicted as an example of a pressing method, but needless to say, smaller heated S-shaped arranged rolls may be used depending on the purpose.

Then, the sheet-like integrated object is cooled on a cooling device 461, is taken up by a take-up device 462, followed by peeling off the release sheet 446, and then, is wound up in a winder 464, whereby a sheet-like integrated object 472 composed of a prepreg and a release sheet can be obtained as a product.

Here, the depiction of a matrix resin supply device and an on-line monitoring device is omitted in FIG. 22.

Figure 23:
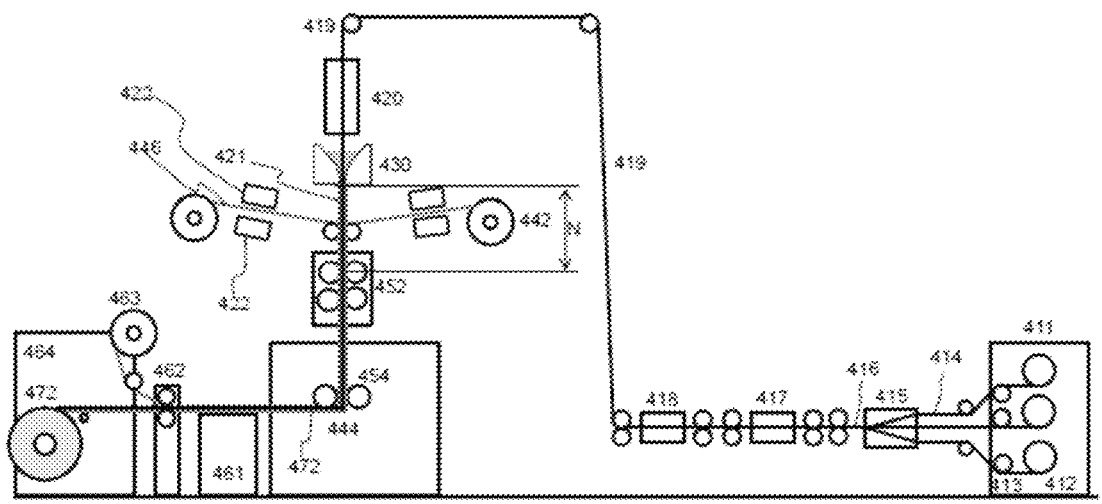
FIG. 23 is a schematic diagram of an example of another prepreg production process using the second production method according to the present invention.

FIG. 23 is a schematic diagram of another example of a prepreg production process/device using the second production method. FIG. 23 is different from FIG. 23 in that the reinforcing fiber bundle 414 withdrawn from the creels 411 is directly formed into the reinforcing fiber sheet 416 in the reinforcing fiber arrangement device 415, and conveyed linearly through the fiber bundle widening device 417 and the smoothing device 418, followed by introducing the reinforcing fiber sheet 416 upward. Such a configuration eliminates the necessity to install the devices in the upper places and can simplify the installation of platforms and the like significantly.

Figure 24:
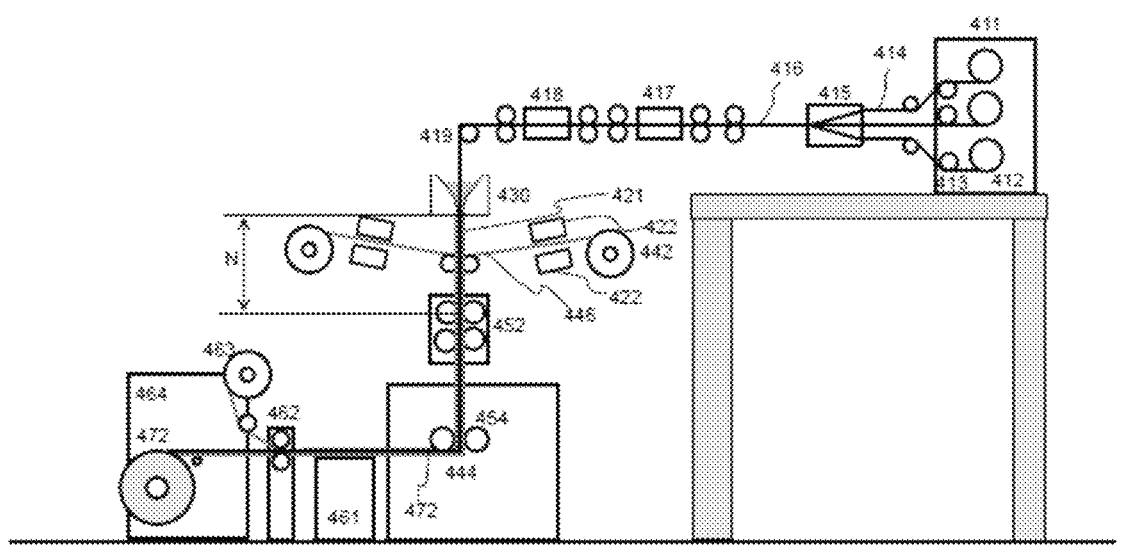
FIG. 24 is a schematic diagram of an example of another prepreg production process using the second production method according to the present invention.

FIG. 24 is a schematic diagram of another example of a process/device for producing a prepreg using the present invention. In FIG. 24, the creels 411 are installed upstairs, and the running pathway of the reinforcing fiber sheet 416 is further linearized.

Figure 25:
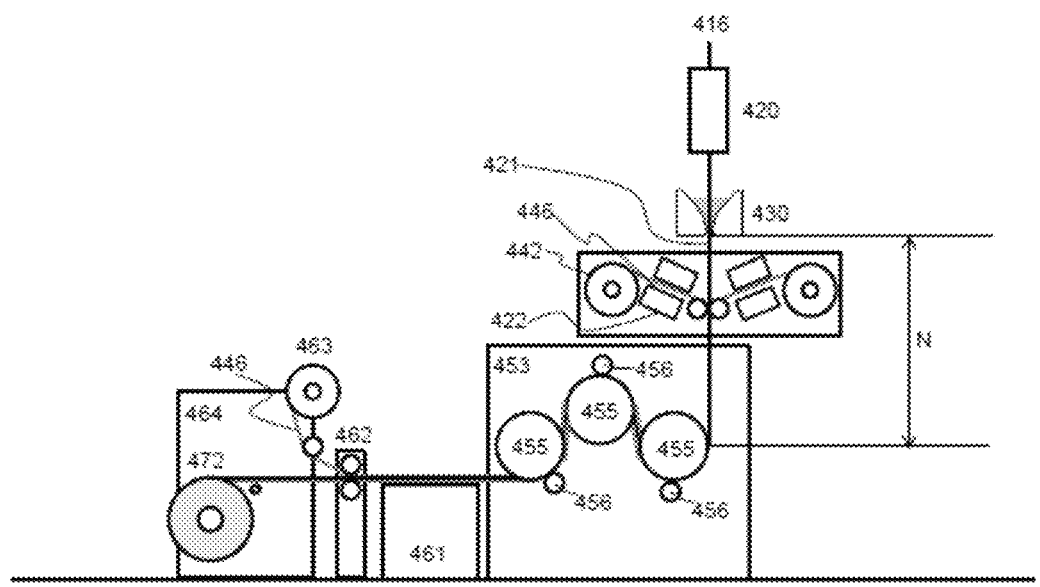
FIG. 25 is a schematic diagram of an example of another prepreg production process using the second production method according to the present invention.

FIG. 25 is a schematic diagram of another example of a process/device for producing a prepreg using the present invention. This illustrates an example in which heated S-shaped arranged rolls 455 are used also as a high tension take-up device. This also has an advantage in that the whole prepreg production apparatus can be made very compact. In this example, contact rolls 456 are arranged to increase the degree of impregnation, but such contact rolls are optionally not arranged.

In this regard, the first production method, the second production method, and the third production method according to the present invention can be used suitably also in combination.

EXAMPLES

In this EXAMPLES section, Examples 1 to 3 correspond to the first production method, Examples 4 to 5 correspond to the second production method, and Examples 6 to 15 correspond to the third production method.

<Prepreg Production Apparatus>

Figure 26:
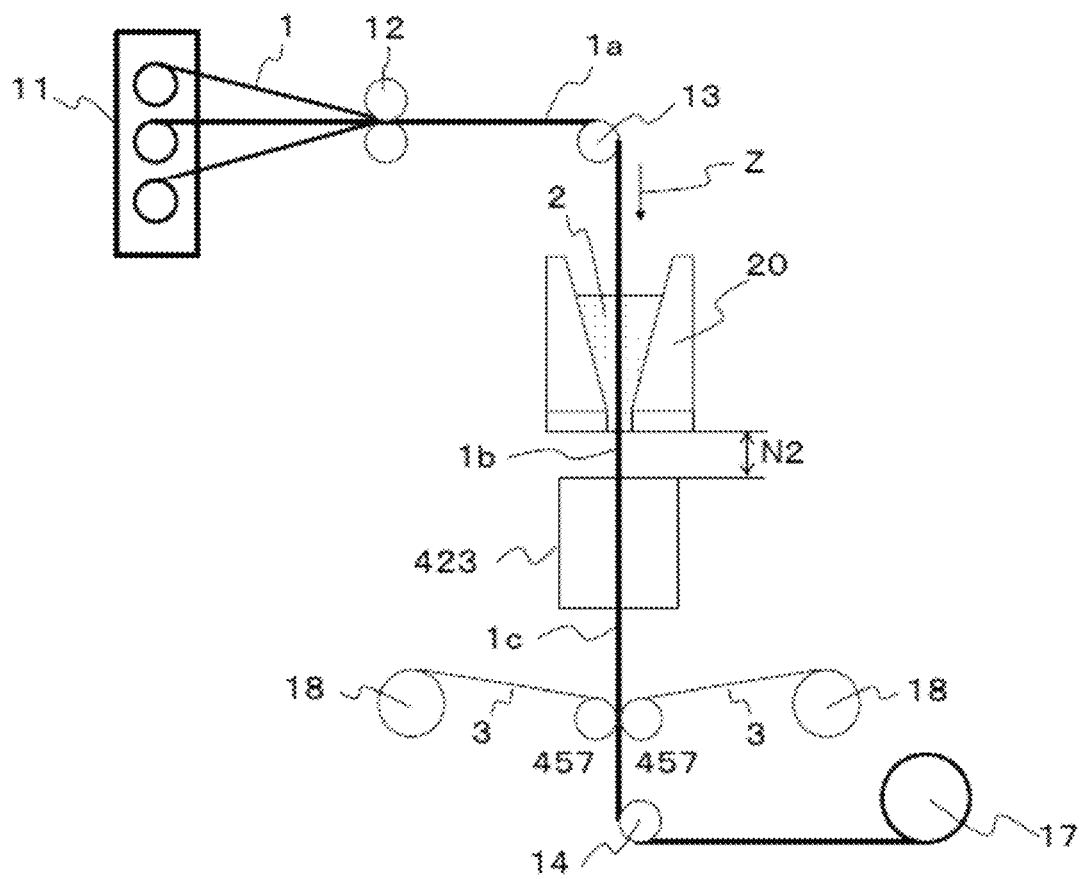
FIG. 26 is a schematic diagram depicting an example of an embodiment of a prepreg production process using the first production method according to the present invention.

A prepreg production apparatus used was a device configured as described in FIG. 26 for the first production method, in FIG. 22 for the second production method, and in FIG. 3 for the third production method (the description of a matrix resin supply section is omitted). Here, none of a widening device, a smoothing device, and a cooling device was used.

<Coating Section>

In the first production method and the second production method, a coating section of the type 20c in the form depicted in FIG. 17 was used as a coating section. The coating section was made of stainless steel. Furthermore, to heat the matrix resin, a ribbon heater was wound around the periphery of the coating section so that the temperature and viscosity of the matrix resin could be adjusted while the temperature was measured with a thermocouple. In addition, the running direction of the reinforcing fiber sheet in the liquid pool was the vertically downward direction, and the liquid pool was tapered in two tiers. The opening angle of the first-tier taper was 17°, and the taper had a height (i.e., H) of 100 mm, and the opening angle of the second-tier taper was 7°. In addition, plate-like bushes 27 conformed to the internal shape of the coating section were provided as a width regulation mechanism, as described in FIG. 10. L2 was 20 mm, and the gap D of the narrowed section was 0.2 mm. In addition, the space external to each bush was closed off at the outlet face of the narrowed section so that the matrix resin could not leak through the outlet of the narrowed section.

In the third production method, a coating section in symmetrical block shape as in FIG. 7 was used. The liquid pool 22 was a tapered flow path whose cross-sectional area decreased continuously, the height H of the liquid pool 22 was 100 mm, the opening angle θ of the tapered portion was 30°, and the gap D of the narrowed section 23 was 0.2 mm (in slit-like shape, having an aspect ratio of 100). Stainless steel-made blocks were used as the wall constituent members 21a and 21b forming the liquid pool 22 and the narrowed section 23. Stainless steel-made plates were used as side plate members 24. Furthermore, to melt the epoxy resin, a ribbon heater was wound around the periphery of the wall constituent members 21 and the side plate members 24, and the temperature of the epoxy resin as a matrix resin was adjusted to 90° C. with a temperature being measured using a thermocouple.

<Release Sheet>

A release paper sheet having a width of 100 mm was used as a release sheet. A release sheet heating device was used in Example 5 and Comparative Example 5. The release sheet heating device used was a heat gun. The release sheet was heated with the heat gun which was placed at a position 30 cm toward the release sheet supply device from a position at which the matrix resin-impregnated reinforcing fiber sheet was brought in contact with the release sheet. The distance at which the heat gun was directed to the release sheet was adjusted so that the temperature of the center of the release sheet in the width direction could be 90° C. at a position 10 cm toward the release sheet supply device from a position at which the matrix resin-impregnated reinforcing fiber sheet was brought in contact with the release sheet. In this regard, the position at which the matrix resin-impregnated reinforcing fiber sheet was brought in contact with the release sheet was set so as to be 30 cm toward the high tension take-up device from the outlet of the coating section.

<Additional-Impregnation Device>

In the first production method, a noncontact heating device used was an infrared heater. The length of the heating section was set to 0.5 m.

In the second production method, two heated nip rolls were used for pressing in the additional-impregnation process, as shown in FIG. 22. In this regard, the nip rolls nearer the coating section were disposed such that the distance N from the outlet of the coating section to the starting point of the pressing in the additional-impregnation device was 0.5 m, and the nip rolls nearer the high tension take-up device were disposed such that the distance from these nip rolls to the starting point of the pressing on the nip rolls nearer the coating section was 100 mm. The diameter of the nip roll was 50 mm. The nip roll had a heater therein, and was heated such that the surface temperature was 100° C. The nip force of the nip roll during pressing was set to 400 N.

<Reinforcing Fiber Sheet>

A prepreg was produced using three yarns of carbon fiber ("TORAYCA®" T800S (24K), manufactured by Toray Industries, Inc.) as reinforcing fibers.

<Matrix Resin>

Matrix Resin A (Thermosetting Epoxy Resin Composition):

a mixture of an epoxy resin (a mixture of an aromatic amine type of epoxy resin and a bisphenol type of epoxy resin), a hardener (diaminodiphenyl sulfone), and polyethersulfone. The viscosity of this thermosetting epoxy resin 1 was measured using the ARES-G2 manufactured by TA Instruments, Inc. at a measurement frequency of 0.5 Hz at a temperature ramp rate of 1.5° C./minute and was found to be 3675 Pa·s at 40° C., 855 Pa·s at 50° C., 80 Pa·s at 70° C., 51 Pa·s at 75° C., and 15 Pa·s at 90° C.

<Evaluation of Degree of Impregnation>

A sampled prepreg was sandwiched between adhesive tapes, these were peeled off, and the reinforcing fiber to which the matrix resin adhered and the reinforcing fiber to which the matrix resin did not adhered were separated. Then, the ratio of the mass of the reinforcing fiber to which the matrix resin stuck with respect to the mass of the whole reinforcing fiber sheet that was used was regarded as a degree of impregnation of the matrix resin based on a peeling method.

A degree of impregnation of 90% or more was rated as Excellent, 70% or more and less than 90% as Good, and less than 70% as Bad.

<Evaluation of Prepreg Grade>

A sampled prepreg was laminated/cured to obtain a composite plate, and the cross-section of the composite plate was observed to find disturbance in the reinforcing fiber layer.

<Measurement of Surface Temperature>

The surface temperature P2 (° C.) of the matrix resin-impregnated reinforcing fiber sheet at the completion point of heating, the surface temperature P (° C.) of the matrix resin-impregnated reinforcing fiber sheet before the additional-impregnation process, the surface temperature T (° C.) of the release sheet, and the surface temperature K (° C.) of the matrix resin-impregnated reinforcing fiber sheet before having the release sheet applied thereto were measured using an infrared radiation thermometer AD-5611A (with the emissivity set to and fixed at 0.95; manufactured by A&D Company, Limited). The measurement was made with the infrared thermometer placed 55 cm apart from the sample to be measured. P2 in the first production method was a measured temperature of the center of the matrix resin-impregnated reinforcing fiber sheet 10 cm downstream of the noncontact heating device. The surface temperature P (° C.) of the matrix resin-impregnated reinforcing fiber sheet before the additional-impregnation process in each of Example 4 and Comparative Example 6 in the second production method was measured as the surface temperature of the width direction center at a distance of 10 cm toward the coating section from the starting point of the pressing on the nip roll nearer the coating section. The matrix resin-impregnated reinforcing fiber sheet before the additional-impregnation process in each of Example 5, Comparative Example 2, and Comparative Example 5 had a release sheet applied thereto, and thus, the temperature measured as the surface temperature P (° C.) of the sheet was the surface temperature P of the width direction center of the release sheet, wherein the center was located at a distance of 10 cm toward the coating section from the starting point of the pressing on the nip roll nearer the coating section. Furthermore, in each of Example 5, Comparative Example 4, and Comparative Example 5, in each of which the release sheet was used, the temperature measured as the surface temperature T (° C.) of the release sheet before being brought in contact with the matrix resin-impregnated reinforcing fiber sheet was the surface temperature of the width direction center point at a distance of 10 cm toward the release sheet supply device from a position at which the release sheet was brought in contact with the matrix resin-impregnated reinforcing fiber sheet. The temperature measured as the surface temperature K (° C.) of the matrix resin-impregnated reinforcing fiber sheet before having a release sheet applied thereto was the surface temperature of the width direction center point at a distance of 10 cm toward the coating section from a position at which the release sheet was brought in contact with the matrix resin-impregnated reinforcing fiber sheet.

Example 1

Reinforcing fibers were withdrawn from reinforcing fiber bobbins fit onto creels, three reinforcing fiber yarns were arranged in the width direction by a reinforcing fiber arrangement device to form a reinforcing fiber sheet, and the resulting reinforcing fiber sheet was introduced into a coating section storing a matrix resin A heated to 90° C., so that the matrix resin A was applied to the sheet. Then, the matrix resin-impregnated reinforcing fiber sheet was withdrawn from the coating section, a noncontact heating device was disposed such that the distance N2 from the outlet of the coating section to the noncontact heating device was 0.5 m, and the sheet was heated by infrared rays such that P2 was 130° C., i.e., P2−M=40 (° C.), and then, provided with a release paper, whereafter the resulting sheet was wound up by a winder. The running speeds of the reinforcing fiber sheet and the prepreg were 10 m/minute. The degree of impregnation of the obtained prepreg was evaluated and found to be 92%, which was rated as Good. In addition, the cross-section of the laminated/cured composite was observed, revealing that no disturbance was found in the carbon fiber layer and that the grade of the prepreg was good.

Examples 2 and 3

With the temperature P2 at 115° C. (P2−M=25 (° C.) in Example 2) and at 95° C. (P2−M=5 (° C.) in Example 3), prepregs were obtained in the same manner as in Example 1, and the degrees of impregnation were evaluated and found to be 83% and 75% respectively, which were both rated as Good. In addition, the cross-section of the laminated/cured composite was observed, revealing that no disturbance was found in the carbon fiber layer and that the grade of the prepreg was good.

Comparative Example 1

With the temperature P2 at 85° C. (P2−M=−5 (° C.)), a prepreg was obtained in the same manner as in Example 1, and the degree of impregnation was evaluated and found to be 65%, which was rated as Bad.

Comparative Example 2

A noncontact heating device was mounted such that the distance N2 from the outlet of the coating section to the noncontact heating device was 1.3 m, and the running speed of the prepreg was set to 10 m/minute, resulting in decreasing the surface temperature of the matrix resin-impregnated reinforcing fiber sheet before being introduced into the noncontact heating device, and thus, the capability of the infrared heater of the noncontact heating device was not sufficient for reheating, failing to increase the temperature P2 to 90° C. This caused the degree of impregnation to be less than 70%, which was rated as Bad.

Comparative Example 3

An experiment was carried out in the same manner as in Comparative Example 2 such that the distance N2 from the outlet of the coating section to the noncontact heating device was 1.3 m, but except that the running speed of the prepreg was 0.5 m/minute, with the result that a longer time for reheating was enabled to be secured, thus enabling the temperature P2 to be increased to 90° C., but observing the cross-section of the laminated/cured composite revealed that some disturbance was found in the carbon fiber layer and that the prepreg grade was not good.

tapes were impregnated sufficiently, and accordingly the resin sticking to the cutter blade of the slitter was a little.

Comparative Example 4

A prepreg was obtained in the same manner as in Example 5 except that a release sheet heating device was not used. Then, the release paper was peeled off using a release sheet

TABLE 1

|  |  | Example 1 | Example 2 | Example 3 | Comparative Example 1 | Comparative Example 2 | Comparative Example 3 |
|---|---|---|---|---|---|---|---|
| Conditions | N2 |  | 0.5 m |  | 0.5 m |  | 1.3 m |
|  | P2 | M + 40° C. | M + 25° C. | M + 5° C. | M − 5° C. | less than M ° C. | M ° C. |
|  | Running Speed |  | 10 m/minute |  | 10 m/minute |  | 0.5 m/minute |
| Evaluation Items | Impregnation Ratio | 92% | 83% | 75% | 65% | less than 70% | — |
|  | Grade | Good | Good | Good | — | — | Not good |

Example 4

Reinforcing fibers were withdrawn from reinforcing fiber bobbins fit onto creels, three reinforcing fiber yarns were arranged in the width direction by a reinforcing fiber arrangement device to form a reinforcing fiber sheet, and the resulting reinforcing fiber sheet was introduced into a coating section storing a matrix resin A heated to 90° C., so that the matrix resin A was applied to the sheet. Then, a matrix resin-impregnated reinforcing fiber sheet was withdrawn from the coating section; an additional-impregnation device was disposed such that the distance N from the outlet of the coating section to the starting point of the pressing in the additional-impregnation device was 0.5 m; the matrix resin-impregnated reinforcing fiber sheet was allowed to pass through the additional-impregnation device such that the sheet was pressed at a nip pressure of 400 N by two heated nip rolls set to 100° C.; and a prepreg was thus obtained and wound up by a winder. The running speeds of the reinforcing fiber sheet and the prepreg were 20 m/minute. The degree of impregnation of the obtained prepreg was evaluated and found to be 80% or more, which was rated as Good. In this regard, the surface temperature P of the matrix resin-impregnated reinforcing fiber sheet before entering the additional-impregnation device was 70° C.

Example 5

A prepreg was obtained in the same manner as in Example 4 except that a release sheet was applied to the prepreg, wherein the surface temperature of the sheet was heated so as to be 90° C. before the sheet entered the additional-impregnation device. Then, the release paper was peeled off using a release sheet (upper) wind-up device 463 to obtain a sheet-like integrated object. The degree of impregnation of the obtained prepreg was evaluated and found to be 80% or more, which was rated as Good. In this regard, the surface temperature P of the matrix resin-impregnated reinforcing fiber sheet before entering the additional-impregnation device was 75° C. as measured on the release sheet, the surface temperature T of the release sheet was 90° C., and the surface temperature K of the matrix resin-impregnated reinforcing fiber sheet before having the release sheet applied thereto was 80° C.

Here, the prepregs obtained in Example 4 and Example 5 were slit to obtain 7 mm wide prepreg tapes. These prepreg tapes were impregnated sufficiently, and accordingly the resin sticking to the cutter blade of the slitter was a little.

(upper) wind-up device 463 to obtain a sheet-like integrated object. The degree of impregnation of the obtained prepreg was evaluated and found to be less than 70%, which was rated as Bad. In this regard, the surface temperature P of the matrix resin-impregnated reinforcing fiber sheet before entering the additional-impregnation device was 35° C. as measured on the release sheet, the surface temperature T of the release sheet was 23° C., and the surface temperature K of the matrix resin-impregnated reinforcing fiber sheet before having the release sheet applied thereto was 80° C.

Example 5 and Comparative Example 4 verified that heating the release sheet inhibited the matrix resin-impregnated reinforcing fiber sheet from being cooled, making it possible to obtain a prepreg having a desired degree of impregnation.

Comparative Example 5

A matrix resin reinforcing fiber sheet was obtained in the same manner as in Example 5 except that no pressing was carried out by the nip rolls. The degree of impregnation of the obtained matrix resin-impregnated reinforcing fiber sheet was evaluated and found to be less than 70%, which was rated as Bad.

Example 5 and Comparative Example 5 verified that pressing is needed to obtain a desired degree of impregnation in the second production method.

Comparative Example 6

A prepreg was produced in the same manner as in Example 4 except that an additional-impregnation device was disposed such that the distance N from the outlet of the coating section to the starting point of the pressing in the additional-impregnation process was 1.5 m. The degree of impregnation of the obtained prepreg was evaluated and found to be less than 70%, which was rated as Bad. In this regard, the surface temperature P of the matrix resin-impregnated reinforcing fiber sheet before the additional-impregnation process was 50° C.

Example 4 and Comparative Example 6 verified that the distance N of more than 1 m from the outlet of the coating section to the starting point of the pressing in the additional-impregnation process caused the surface temperature of the matrix resin-impregnated reinforcing fiber sheet to be low, failing to afford a prepreg having a desired degree of impregnation.

TABLE 2

|  |  | Example 4 | Example 5 | Comparative Example 4 | Comparative Example 5 | Comparative Example 6 |
|---|---|---|---|---|---|---|
| Conditions | N | 0.5 m | | 0.5 m | | 1.5 m |
|  | P | M − 20° C. | M − 15° C. | M − 55° C. | M − 15° C. | M − 40° C. |
|  | T | — | K + 10° C. | K − 57° C. | K + 10° C. | — |
|  | Pressing | done | | done | not done | done |
| Evaluation Items | Impregnation Ratio | 80% or more | 80% or more | less than 70% | less than 70% | less than 70% |

Example 6

Using the coating section 20 in FIG. 7 according to an embodiment of the present invention, a molten epoxy resin was applied to a carbon fiber sheet. Three stainless steel-made polished bars having a diameter of 10 mm and a length of 40 mm were used as a group of bars 35. The holding angles between the carbon fiber sheet and the bars 35a, 35b, and 35c were formed so as to be 10°, 20°, and 10° respectively, and all the bars were sunk in the matrix resin 2. In addition, the bar 35a located at the highest position was brought in contact with the opposite face of the carbon fiber sheet from the face brought in contact with the guide roll 13. The group of bars 35, which had a uniform cross-section in the longitudinal direction as in FIG. 11, did not include a width regulation member. In addition, the width W1 of the slit-like outlet was 20 mm. The degree of impregnation of the resulting prepreg was quantitatively evaluated by a peeling method. Measuring the degree of impregnation of the coating liquid by a peeling method can be carried out in the following manner. That is, a sampled coating liquid impregnated reinforcing fiber sheet is sandwiched between adhesive tapes, these are peeled off, and the reinforcing fiber to which the coating liquid has stuck and the reinforcing fiber to which the coating liquid has not stuck are separated. Then, the ratio of the mass of the reinforcing fiber to which the coating liquid has stuck to the mass of the whole reinforcing fiber sheet that has been used can be regarded as a degree of impregnation of the coating liquid based on a peeling method. The degree of impregnation of the obtained prepreg in Example 7 was 73%.

Comparative Example 7

Next, all the group of bars 35 were removed from the coating section 20 according to the embodiment in FIG. 7, and the coating section, which did not meet the requirements of the present invention, was used to apply a molten epoxy resin to a carbon fiber sheet. The degree of impregnation of the obtained sheet-like prepreg was measured by a peeling method, and found to be 50%.

Example 7

Figure 27:
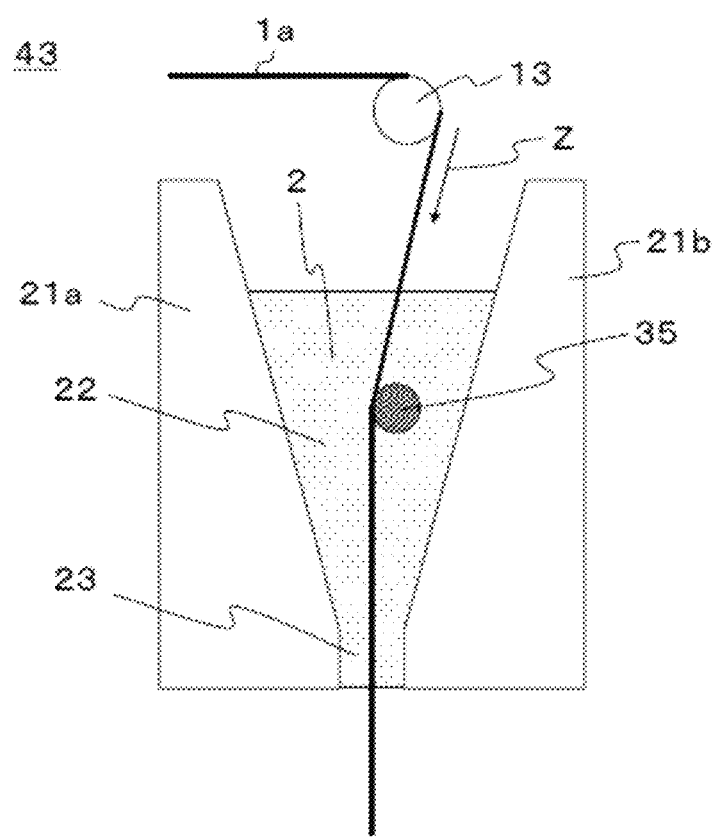
FIG. 27 is a schematic diagram depicting an example of an embodiment of a coating section used in a third production method according to the present invention.

Next, using the coating section 43 in FIG. 27 according to an embodiment of the present invention, a molten epoxy resin was applied to a carbon fiber sheet. Differently from the coating section 40 according to the embodiment in FIG. 7, only one polished bar having a diameter of 10 mm and a length of 40 mm was used as a bar 35. The holding angle between the carbon fiber sheet and the bar 35 was formed so as to be 20°. In addition, the bar 35 was sunk in the coating liquid 2. The degree of impregnation of the obtained sheet-like prepreg was measured by a peeling method, and found to be 60%. The absolute value of the degree of impregnation was low, but the comparison with Comparative Example 7 verifies the effect of the bar.

TABLE 3

|  |  | Example 6 | Comparative Example 7 | Example 7 |
|---|---|---|---|---|
| Performing Conditions | Number of Bars | three | none | one |
| Evaluation Items | Impregnation Ratio (mass %) | 73% | 50% | 60% |

Next, Table 4 lists the results of the experiment in which, using the coating section 41 in FIG. 12 according to an embodiment of the present invention, a molten epoxy resin was applied to a carbon fiber sheet to produce a sheet-like prepreg. In this regard, the running speed of the carbon fiber sheet was set to 20 m/minute in any of the Examples. The detail will be explained below.

Example 8

Using the coating section 41 shown in FIG. 12 according to the present invention, a molten epoxy resin was applied to a carbon fiber sheet. A group of bars 36 used were stainless steel-made bars having disc-like width regulation members large in diameter at both ends thereof, as shown in FIG. 13. The diameter d1 of the group of bars 36 was 10 mm, the diameter d2 of the width regulation member was 14 mm, the spacing W2 between the width regulation members was 20 mm, and the thickness W3 of the width regulation member was 2 mm. The bar and the width regulation members were an integrated object into which one polished bar was carved and produced. The group of bars 36 were arranged in the same manner as the bars in the coating section 40 (Example 7) according to the embodiment in FIG. 7, and the holding angles between the carbon fiber sheet and the bars 36a, 36b, and 36c were formed so as to be 10°, 20°, and 10° respectively. In addition, the width W1 of the slit-like outlet was 20 mm, and satisfied the relationship 0≤W1−W2≤10 (W1=W2). Next, the degree of impregnation of the obtained sheet-like prepreg was measured by a peeling method. In addition, to evaluate the quality of the obtained prepreg, the prepreg was visually observed. A prepreg in which the carbon fibers were arranged so as to form a uniform thickness and have no gap over the full width (20 mm) was rated as "Excellent"; a prepreg the thickness of which was partially ununiform (the surface was irregular) but in which the carbon fibers had no gap over the full width was rated as "Good"; and a prepreg in which part(s) of the carbon fibers had a gap, thus having a portion(s) containing only an epoxy resin, or a prepreg the surface of which was fuzzy was rated as "Fair". The degree of impregnation of the prepreg obtained in Example 9 was 73%, and the carbon fibers were arranged so as to form a uniform thickness and have no gap over the full width (the quality was "Excellent").

Here, in the prepreg obtained in Example 7, part of the carbon fibers had a gap, portions of only an epoxy resin were present consecutively in the running direction, and in addition, fuzzing was found at both ends of the prepreg in the width direction (the quality was "Fair").

Example 9

Next, with the width W1 of the slit-like outlet in Example 8 changed to 30 mm, a molten epoxy resin was applied to a carbon fiber sheet. The present Example also satisfied the relationship 0≤W1−W2≤10. The degree of impregnation of the prepreg obtained in Example 9 was 71%, and part of the prepreg was not uniform in thickness (the surface was irregular), but the carbon fibers had no gap over the full width (the quality was "Good").

Example 10

Next, with the width W1 of the slit-like outlet in Example 8 changed to 40 mm, a molten epoxy resin was applied to a carbon fiber sheet. The present Example did not satisfy the relationship 0≤W1−W2≤10. The degree of impregnation of the sheet-like prepreg obtained in Example 10 was 72%, part of the carbon fibers had a gap, and portions of only an epoxy resin were present consecutively in the running direction (the quality was "Fair").

TABLE 4

| | | Example 6 | Example 8 | Example 9 | Example 10 |
|---|---|---|---|---|---|
| Performing Conditions | Width Regulation | No | Yes | Yes | Yes |
| | W1 − W2 | — | 0 mm | 10 mm | 20 mm |
| Evaluation Items | Impregnation Ratio (mass %) | 73% | 73% | 71% | 72% |
| | Quality | Fair | Excellent | Good | Fair |

Next, Table 5 lists the results of the experiment in which, using the coating section 41 in FIG. 12 according to an embodiment of the present invention, a molten epoxy resin was applied to a carbon fiber sheet to produce a prepreg. The performing conditions common to all these Examples were that the running speed of the carbon fiber sheet was set to 20 m/minute, that the group of bars 36 used were bars having width regulation members in the same shape as in Example 8, that the width W1 of the slit-like outlet was 20 mm, and that the relationship 0≤W1−W2≤ was satisfied. The detail will be explained below.

Example 11

With the position of the group of bars 36 adjusted such that the holding angles between the carbon fiber sheet and the bars 36a, 36b, and 36c were formed so as to be 20°, 40°, and 20° respectively, a molten epoxy resin was applied to a carbon fiber sheet. The carbon fiber sheet was observed fluttering at or near the top liquid surface in the liquid pool 22 sometimes while running. The degree of impregnation of the obtained prepreg was measured by a peeling method, and found to be 82%. In addition, the obtained sheet-like prepreg was visually observed and checked for quality, revealing that part of the prepreg was not uniform in thickness (the surface was irregular), but the carbon fibers had no gap over the full width (the quality was "Good").

Example 12

With the position of the group of bars 36 adjusted such that the holding angles between the carbon fiber sheet and the bars 36a, 36b, and 36c were formed so as to be 40°, 80°, and 40° respectively, a molten epoxy resin was applied to a carbon fiber sheet. The carbon fiber sheet was observed fluttering significantly at or near the top liquid surface in the liquid pool 22 while running. The degree of impregnation of the obtained prepreg was measured by a peeling method, and found to be 90% or more. In addition, the prepreg obtained was visually observed and checked for quality, revealing that part of the carbon fibers had a gap, that portions of only an epoxy resin were present consecutively in the running direction, and in addition, that fuzzing was found all over the surface of the prepreg (the quality was "Fair").

Example 13

With the diameter d1 of the group of bars 36 changed to 20 mm, a molten epoxy resin was applied to a carbon fiber sheet. The diameter d2 of the width regulation member was set to 24 mm. In addition, the position of the group of bars 36 was adjusted such that the holding angles between the carbon fiber sheet and the bars 36a, 36b, and 36c were formed so as to be 10°, 20°, and 10° respectively. The degree of impregnation of the obtained prepreg was measured by a peeling method, and found to be 84%. In addition, the obtained sheet-like prepreg was visually observed and checked for quality, revealing that part of the prepreg was not uniform in thickness (the surface was irregular), but the carbon fibers had no gap over the full width (the quality was "Good").

TABLE 5

| | | Example 8 | Example 11 | Example 12 | Example 13 |
|---|---|---|---|---|---|
| Performing Conditions | Bar Diameter d1 | 10 mm | 10 mm | 10 mm | 20 mm |
| | Largest Holding Angle | 20° | 40° | 80° | 20° |
| Evaluation Items | Impregnation Ratio (mass %) | 73% | 82% | >90% | 84% |
| | Quality | Excellent | Good | Fair | Good |

Example 14

Figure 28:
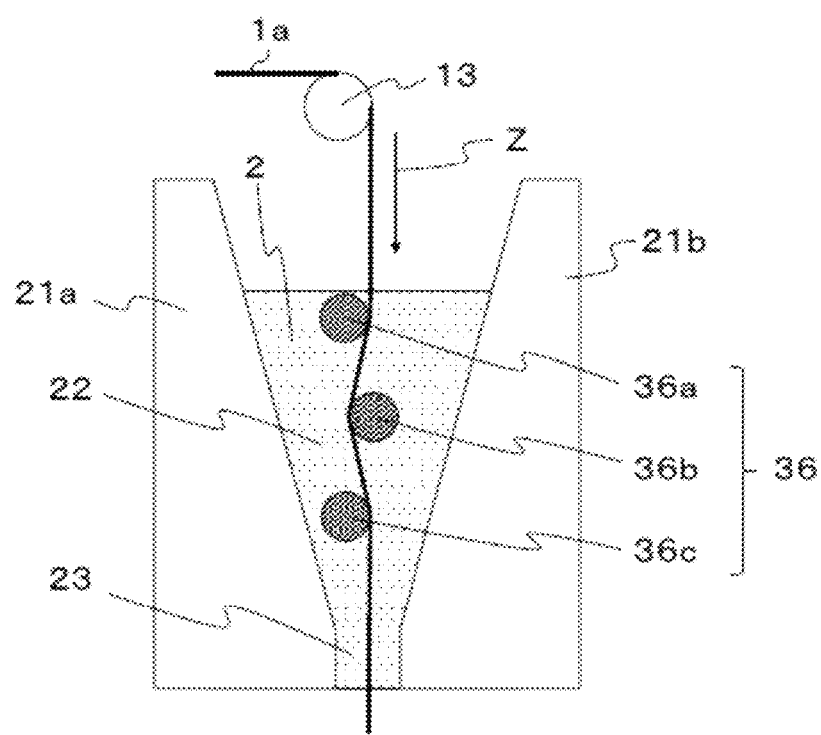
FIG. 28 is a schematic diagram depicting an example of an embodiment of another coating section used in a third production method according to the present invention.

Next, using the coating section 44 in FIG. 28 according to the present invention, a molten epoxy resin was applied to a carbon fiber sheet. The running speed of the carbon fiber sheet was set to 20 m/minute. The performing conditions in the present Example were the same as in Example 8 except that the group of bars 36 were brought in contact with the opposite face of the carbon fiber sheet from the face brought in contact with the group of bars 36 in Example 8. In the present Example, the bar 36a located at the highest position was brought in contact with the same face of the carbon fiber sheet as the face brought in contact with the guide roll 13. The carbon fiber sheet 1a was observed fluttering at or near the top liquid surface in the liquid pool 22 sometimes while running. The degree of impregnation of the obtained sheet-like prepreg was measured by a peeling method, and found to be 70%. In addition, the obtained sheet-like prepreg was visually observed and checked for quality, revealing that part of the prepreg was not uniform in thickness (the surface was irregular), but the carbon fibers had no gap over the full width (the quality was "Good").

TABLE 6

|  |  | Example 8 | Example 14 |
|---|---|---|---|
| Performing Conditions | Contact Face of Bar at Highest Position | Opposite Side from Face in Contact with Guide Roll | Same Side as Face in Contact with Guide Roll |
| Evaluation Items | Impregnation Ratio (mass %) | 73% | 70% |
|  | Quality | Excellent | Good |

Example 15

Using the coating section 41 in FIG. 12 according to an embodiment of the present invention, a molten epoxy resin was applied to a carbon fiber sheet. The performing conditions were the same as in Example 9 except that the running speed of the carbon fiber sheet was set to 5 m/minute. The degree of impregnation of the obtained prepreg was measured by a peeling method, and in addition, to evaluate the quality of the obtained prepreg, the prepreg was visually observed. A prepreg in which the carbon fibers were arranged so as to form a uniform thickness and have no gap over the full width (20 mm) was rated as "Excellent"; a prepreg the thickness of which was partially ununiform (the surface was irregular) but in which the carbon fibers had no gap over the full width was rated as "Good"; and a prepreg in which part(s) of the carbon fibers had a gap, thus having a portion(s) containing only an epoxy resin, or a prepreg the surface of which was fuzzy was rated as "Fair". The degree of impregnation of the sheet-like prepreg obtained in Example 9 was 90% or more, and the carbon fibers were arranged so as to form a uniform thickness and have no gap over the full width (the quality was "Excellent").

TABLE 7

|  |  | Example 8 | Example 15 |
|---|---|---|---|
| Performing Conditions | Running Speed | 20 m/minute | 5 m/minute |
| Evaluation Items | Impregnation Ratio (mass %) | 73% | >90% |
|  | Quality | Excellent | Excellent |

INDUSTRIAL APPLICABILITY

The prepreg obtained by the production method according to the present invention can widely be applied as FRP typified by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

REFERENCE SIGNS LIST

1 Reinforcing Fiber
1a Reinforcing Fiber Sheet
1b Matrix Resin-impregnated Reinforcing Fiber Sheet
1c Prepreg
2 Matrix Resin
3 Release Sheet
11 Creel
12 Arrangement Device
13, 14, 15, 16 Conveyance Roll
17 Wind-up Device
18 Release Sheet Supply Device
18a Release Sheet Heating Device
19 Additional-impregnation Device
20 Coating Section
20b Coating Section in another embodiment
20c Coating Section in another embodiment
20d Coating Section in another embodiment
20e Coating Section in another embodiment
21a, 21b Wall Constituent Members
21c, 21d Wall Constituent Members having another shape
21e, 21f Wall Constituent Members having another shape
21g, 21h Wall Constituent Members having another shape
21i, 21j Wall Constituent Members having another shape
22 Liquid Pool
22a Region whose cross-sectional area decreases continuously in Liquid Pool
22b Region whose cross-sectional area does not decrease in Liquid Pool
22c Region whose cross-sectional area decreases intermittently in Liquid Pool
23 Narrowed Section
24, 24a, 24b Side Plate Members
25 Outlet
26 Clearance Gap
27 Plate-like Bush
27a, 27b Width Regulation Mechanism
30 Coating Section
31a, 31b Wall constituent members
32 Liquid Pool
33 Region whose cross-sectional area decreases intermittently in Liquid Pool
35a, 35b, 35c Bars
36a, 36b, 37c Bars in another embodiment
40 Coating Section in another embodiment
41 Coating Section in another embodiment
43 Coating Section in another embodiment
44 Coating Section in another embodiment
100 Coating Device
101 Coating Device
B Depth of Liquid Pool 22
C Height up to the liquid surface at the top of Liquid Pool 22
D Gap of Narrowed Section
E Width Direction of Liquid Pool G Position at which width regulation is carried out
H Vertical Height along which the cross-sectional area of Liquid Pool 22 decreases continuously
L Width of Liquid Pool 22
N Distance from Outlet of Coating Section to Starting Point of Pressing in Additional-impregnation
N2 Distance from Outlet of Coating Section to Starting Point of Heating by Noncontact Type Heating Device
R, Ra, Rb Voltex Stream in the Edge
T Circulating Streams
W Width of Reinforcing Fiber Sheet Prepreg 1b, as measured immediately under Narrowed Section 23
Y Width of Narrowed Section 23
Z Running Direction (Vertically Downward Direction) of Reinforcing Fiber Sheet 1a
θ Opening Angle of Tapered Portion
411 Creel
412 Reinforcing Fiber Bobbin
413 Diverting Guide
414 Reinforcing Fiber Bundle
415 Reinforcing Fiber Arrangement Device
416 Reinforcing Fiber Sheet
417 Fiber Bundle Widening Device
418 Smoothing Device
419 Diverting Roll
420 Reinforcing Fiber Preheating Device
421 Matrix Resin-impregnated Reinforcing Fiber Sheet
422 Release Sheet Heating Device
423 Noncontact Heating Device
430 Coating Section
440 Additional-impregnation Device
442 Release Sheet Supply Device
444 High Tension Take-up Device
445 Diverting Roll
446 Release Sheet
452 Heated Nip Roll
455 Heated S-shaped Arranged Roll
456 Contact Roll
461 Cooling Device
462 Take-up Device
463 Release Sheet (Upper) Wind-up Device
464 Winder
471 Prepreg (Reinforcing Fiber Sheet Prepreg)
472 Prepreg/Release Sheet (Sheet-like Integrated Object)

The invention claimed is:

1. A method of producing a prepreg, comprising the steps of:
allowing a reinforcing fiber sheet to pass substantially vertically downward through an inside of a coating section storing a matrix resin to apply said matrix resin to said reinforcing fiber sheet to obtain a matrix resin-impregnated reinforcing fiber sheet; and
heating said matrix resin-impregnated reinforcing fiber sheet in a noncontact manner,
wherein said coating section comprises a liquid pool and a narrowed section which are in communication with each other, said liquid pool having a portion whose cross-sectional area decreases continuously along a running direction of said reinforcing fiber sheet,
wherein said portion of the liquid pool is formed by wall constituent members having a vertical height of 10 mm or more that are opposed to each other with a gap in between to generate a circulation flow in the liquid pool for removal of fuzz and/or for prevention of clogging fuzz,
wherein said narrowed section has a slit-like cross-section and has a smaller cross-sectional area than an area of a top side of said liquid pool and has a gap so that said reinforcing fiber sheet is automatically aligned,
wherein the noncontact heating is started within a region of 1 m from an opening of said narrowed section in the running direction of said matrix resin-impregnated reinforcing fiber sheet,
wherein below Formula 1 is satisfied assuming that a surface temperature of said matrix resin-impregnated reinforcing fiber sheet is P2 (° C.) at a completion point of the heating and that a temperature of said matrix resin stored in the inside of said coating section is M (° C.), $$M \le P2 \tag{Formula 1}$$

wherein said coating section comprises, in said liquid pool, a width regulation mechanism for regulating a width of said reinforcing fiber sheet, and wherein a relationship between a width (W) of said reinforcing fiber sheet immediately under said narrowed section and a width (L2) regulated by said width regulation mechanism at a lower end of said width regulation mechanism satisfies $$L2 \le W+10 \text{ (mm)}.$$

2. The method of producing a prepreg according to claim 1, further comprising a step of pressing said matrix resin-impregnated reinforcing fiber sheet after the step of heating in a noncontact manner.

3. The method of producing a prepreg according to claim 1, wherein the obtained prepreg has a degree of impregnation of 70% or more based on a peeling method.

4. A method of producing a prepreg tape, comprising slitting a prepreg obtained using the method of producing a prepreg according to claim 1.

5. A method of producing a fiber reinforced composite material, comprising curing a prepreg obtained using the method of producing a prepreg according to claim 1.

6. The method of producing a prepreg according to claim 1, wherein said noncontact heating is selected from the group of infrared heating, far-infrared heating, laser heating and steam heating.

7. The method of producing a prepreg according to claim 1, wherein a heating distance in the noncontact heating is 1 m or less.

8. A prepreg production apparatus, comprising:
a running mechanism for allowing a reinforcing fiber sheet to run substantially vertically downward;
a coating mechanism for applying a matrix resin to said reinforcing fiber sheet to obtain a matrix resin-impregnated reinforcing fiber sheet; and
a heating mechanism for heating said matrix resin-impregnated reinforcing fiber sheet,
wherein said coating mechanism can store a coating liquid therein and includes a liquid pool and a narrowed section which are in communication with each other,
wherein said liquid pool has a portion whose cross-sectional area decreases continuously along a running direction of a sheet-like reinforcing fiber bundle,
wherein said portion of the liquid pool is formed by wall constituent members having a vertical height of 10 mm or more that are opposed to each other with a gap in between to generate a circulation flow in the liquid pool for removal of fuzz and/or or prevention of clogging fuzz,
wherein said narrowed section has a slit-like opening that can be used to guide said matrix resin-impregnated reinforcing fiber sheet out, and wherein an area of the opening is smaller than an area of a top side of said liquid pool and has a gap so that said reinforcing fiber sheet is automatically aligned,
wherein said coating mechanism in said liquid pool further comprises a width regulation mechanism between side wall members for regulating a width of said reinforcing fiber sheet, and wherein said heating mechanism is a noncontact heating means, and is disposed so as to be started within a region of 1 m from said opening of said narrowed section in the running direction of said matrix resin-impregnated reinforcing fiber sheet.

9. The prepreg production apparatus according to claim 8, wherein said noncontact heating is selected from the group of infrared heating, far-infrared heating, laser heating and steam heating.

10. The prepreg production apparatus according to claim 8, wherein a heating distance in the noncontact heating is 1 m or less.

* * * * *